US008627288B2

(12) United States Patent
Kimball et al.

(10) Patent No.: US 8,627,288 B2
(45) Date of Patent: Jan. 7, 2014

(54) METHOD AND SYSTEM FOR WEB-SITE TESTING

(75) Inventors: Dean C. Kimball, Renton, WA (US); Peter Crossley, Sammamish, WA (US)

(73) Assignee: Webtrends Inc., Portland, OR (US)

( * ) Notice: Subject to any disclaimer, the term of this patent is extended or adjusted under 35 U.S.C. 154(b) by 1075 days.

(21) Appl. No.: 12/507,765

(22) Filed: Jul. 22, 2009

(65) Prior Publication Data

US 2010/0064281 A1 Mar. 11, 2010

Related U.S. Application Data

(60) Provisional application No. 61/135,572, filed on Jul. 22, 2008.

(51) Int. Cl.
*G06F 9/44* (2006.01)
(52) U.S. Cl.
USPC .......................................................... 717/124
(58) Field of Classification Search
None
See application file for complete search history.

(56) References Cited

U.S. PATENT DOCUMENTS

| | | | |
|---|---|---|---|
| 7,069,497 B1* | 6/2006 | Desai | 715/205 |
| 2002/0097268 A1 | 7/2002 | Dunn et al. | |
| 2003/0005044 A1 | 1/2003 | Miller et al. | |
| 2004/0162874 A1 | 8/2004 | Woo et al. | |
| 2008/0275980 A1* | 11/2008 | Hansen | 709/224 |

FOREIGN PATENT DOCUMENTS

KR 10 2002 0072028 9/2002

* cited by examiner

*Primary Examiner* — Henry Tsai
*Assistant Examiner* — Juanito Borromeo
(74) *Attorney, Agent, or Firm* — Olympic Patent Works PLLC

(57) ABSTRACT

Embodiments of the present invention are directed to methods and systems for testing web sites and web servers. In discussed embodiments of the present invention, a third-party testing service collects page-access and conversion information on behalf of a web site. The third-party testing service is straightforwardly configured through a user interface and is engaged for real-time, live statistics collection by means of simple modifications of HTML files served or provided to users by a web site.

20 Claims, 29 Drawing Sheets

|  | factor 1 | factor 2 | factor 3 | factor 4 |
|---|---|---|---|---|
| level 1 | I DO LEGAL STUFF FOR YOU, REALLY | BOB'S LEGAL SERVICES |  | BILL ME NOW |
| level 2 | I'M YOUR PIT BULL, BABY | HONEST BOB'S LEGAL SERVICES |  | BILL ME HONESTLY NOW |
| level 3 | HEY, POINT ME AND I'LL BITE | CHECKS-IN-THE-MAIL LEGAL SERVICES |  | TAKE MY DOUGH |
| level 4 | I'M YOUR GREAT WHITE SHARK | PREDATOR FOR HIRE |  | BILL ME NOW AND FOREVER |
| level 5 | CONTRACTS, LICENSES, NON-ADVERSARIAL LITIGATION | |  | BILL ME SHAMELESSLY |
| level 6 | I DO ANYTHING FOR MONEY | | | |
|  | | | | |

Figure 7

```
<!DOCTYPE html PUBLIC "-//W3C//DTD XHTML 1.0 transitional//EN" "http://www.w3.org/TR/xhtml1/DTD/xhtml1-transitional.dtd">
<html xmlns="http://www.w3.org/1999/xhtml">
<head>
<meta http-equiv="Content-Type" content="text/html ; charset=UTF-8" />
<title>Demo Web Site: Landing Page walkthrough | Widemile Optimization Platform</title>
<style type="text/css">
body { margin: 0; padding: 0; background: #b3b3b3; text-align:center; } img{ border:none; }
#container{ background: #fff url(images/demo_site_bg.jpg) no-repeat 0 0; margin:36px auto;/*center*/ height:660px; width:952px; }
#header{ padding:24px 24px 0 24px; }
#left{ float:left; width:369px; margin:36px 0px 24px; } * > #left  ( margin:36px 0px 0px 48px; )/*reset ie6 double margin bug*/
#right{ float:right; width:459px; margin:36px 24px 0px 0px; } * > #right ( margin:36px 48px 0px 0px; )/*reset ie6 double margin bug*/
#wm_offer{ margin:36px 0px; }
</style>
<!-- insert: Widemile Optimization Platform Client Library - -->
<script type="text/javascript" src="http://www.widemile.com/js/wm_capi.js"></script>  ─1402
</head>
<body>
<!-- insert: Widemile PageView Tracking Code - ->
<script type="text/javascript">WM.setup();</script>  ─1404
<div id="main_ext">
    <div id="container">
        <div id="header">
        <div id="wm_headline">
            <img src="images/demo_site_hd_green.jpg" alt="Green Headline 1" />
        </div>
    </div>
    <div id="left">
        <div id="wm_hero">
            <img src="images/demo_site_hs_green.jpg" alt="Green Hero 1" />
        </div>
    </div>
    <div id="right">
        <div id="wm_offer">
            <img src="images/demo_site_offer_green.jpg" alt="Green Offer 1" />
        </div>
        <a href="conversion.htm"><div id="wm_button">
            <span id="wm_INSERT_BUTTON">
                <img src="images/demo_site_btn_green.jpg" alt="Green Button 1" />
            </span>
        </div></a>
    </div>
</div>
>/div>
</body>
</html>
```

Figure 14 simplecapi.js

```
//modify the page based on the experiment data
var g_data=null;
var g_moniker=mull;
var g_uid=null;
function loadExperiment() {
                getExperimentDataFromServer();
                var replacements = g_data;
                //render the new elements that where loaded from the server
                for ( var i = 0; i < replacements.length; i++) { document.getElementById(replacements[i].divID).innerHTML=replacements[i].content;
                }
}

//this simulates the kind of data the widemile server would return.
//control.js contains contents of factors and levels to update on the page see below.
//control.js call setExperimentData(data)
//{divID:"hero",content:"<img src='pentagon.png'alt='pentagon'/>"},
//{divID:"info",content:"This is a green pentagon.Look how pretty it is."};

function getExperimentDataFromServer(){
    //create new script block and add to the browser DOM to load external server call
    var script=createElement("script",document.body);
    script.src="http://ots.server.com/js-control/"+g_moniker+"/"+g_uid+"/control.js";
}

//data[{divID:"hero",content;"<img src='pentagon.png'alt='pentagon'/>"},
//     {divID:"info",content:"This is a green pentagon. Look how pretty it is."}];
function setExperimentData(data){
    g_data=data;
} function createVisitorID() {
    var value=null;
    if (document.cookie["uid"]==null) {
       value=newDate().time+"-"+rand(10);
       document.cookie["uid"]=newCookie(value);
    } else {
       value=document cookie["uid"]
    }
      return value;
} function setup(moniker) {
    g_moniker=moniker,
    g_uid=createVisitorID();
    loadExperiment();
}
```

Figure 15

METHOD AND SYSTEM FOR WEB-SITE TESTING

CROSS-REFERENCE TO RELATED APPLICATION

This application claims the benefit of Provisional Application No. 61/135,572, filed Jul. 22, 2008.

TECHNICAL FIELD

The present invention is related to web sites and web-site-based businesses and organizations, and, in particular, to a method and system for testing a web site in order to collect data that can be subsequently used to evaluate and optimize the web site.

BACKGROUND OF THE INVENTION

During the past 20 years, the development of the hypertext markup language ("HTML") and web browsers has led to the creation and development of whole new industries and businesses, including Internet retailing of goods and services, search-engine services, electronic encyclopedias, direct retailing and distribution of multi-media content and software, social-networking services, and a variety of additional industries and businesses. Many businesses are based on a web site, a collection of interlinked web pages that are provided to web-site users from a web server, generally one or more servers or higher-end computer systems that receive web-page requests from users via the Internet and respond to the requests by transmitting, to requesting users, HTML files that encode web pages displayed by browser applications executing on users' computers.

The creation and maintenance of an effective web site may involve engineers and professionals of a number of different disciplines, including software engineers and web-page developers, artists, writers, and other content creators, and analysts who monitor a web site and evaluate the effectiveness of the web site on an on-going basis. As one example, an Internet retailer may spend millions of dollars in retailing web-site design and development, using teams of engineers, developers, and content creators, and may undertake continuous evaluation of retail results associated with a retailing web site, using marketing professionals and other analysts, in order to attempt to identify potential changes to the web site that can be fed back to the designers and content creators in order to optimize the web site with respect to specific goals and constraints. For an Internet retailer, the total amount of sales generated from a retailing web site, the overall number of visitors who navigate past the home page of a website, the number of redirections to allied web sites using links provided on pages of the web site, and many other metrics may comprise the goals for web-site optimization. Constraints may include human and financial resources needed to effect the changes to the web site, the time needed to make the changes, compatibility of added features with widely used browsers and browser plug-in programs, and many other such constraints.

As with any type of live or run-time testing, testing undertaken by marketing professionals and analysts may represent, to a web-site-based business or information service, large expenditures in money, time, and other resources. Furthermore, live testing may unintentionally negatively impact the web site, by creating unintended interruptions, errors, and access delays for customers. Costs and potential liabilities of web-site testing may therefore constitute a significant additional constraint for web-site optimization. For this reason, web-site developers and owners seek cost-effective, time-and-resource-economical, and minimally intrusive methods and systems for web-site testing that can provide a sound statistical basis for web-site analysis and optimization.

SUMMARY OF THE INVENTION

Embodiments of the present invention are directed to methods and systems for testing web sites. In certain embodiments of the present invention, a testing service collects customer page-access and conversion information on behalf of a web site. The testing service is straightforwardly accessed and configured, through a web-site-based user interface, and is virtually incorporated into the web site by simple HTML-file modifications.

BRIEF DESCRIPTION OF THE DRAWINGS

FIGS. 6-7 illustrate factors, factor levels, and test design according to embodiments of the present invention.

FIG. 14 shows the HTML modifications used to virtually incorporate a testing service that represents one embodiment of the present invention into a web site.

FIG. 15 provides an exemplary script library downloaded service that represents one embodiment of the present invention by a testing into a web-site server.

DETAILED DESCRIPTION OF THE INVENTION

Certain embodiments of the present invention are directed to live, real-time testing of a web site. There are many different types of web sites and web-site servers that can be tested by method and system embodiments of the present invention. In the following discussion, a generalized web site is tested by a described embodiment of the present invention. It should be noted, at the onset, that method and system embodiments of the present invention are not restricted to a particular class or type of web sites, but are generally applicable to a wide variety of different types of web sites and web-site based businesses and organizations. For example, embodiments of the present invention can be applied to test and to analyze the effectiveness of an Internet-commerce web site, but can also be applied to non-commercial information-distribution web sites, including on-line encyclopedias, to non-commercial social-networking web sites, to search-engine service providers, and many other types of web sites and web-site-based businesses. It should also be noted, at the onset, that the method and system embodiments of the present invention are primarily directed to minimally-intrusive, cost-effective, and time-and resource-efficient live, on-line experimentation and statistics collection. The statistics and data collected by method and system embodiments of the present invention can be subsequently analyzed by a variety of different analytics packages in order to generate various types of reports that provide information to web sites that can be used for optimization. The analytical analysis and reporting may be executed on the testing service computer facilities, or on remote computing facilities. Method and system embodiments of the present invention also provide time-efficient and cost-efficient test design and test implementation.

Figure 1:
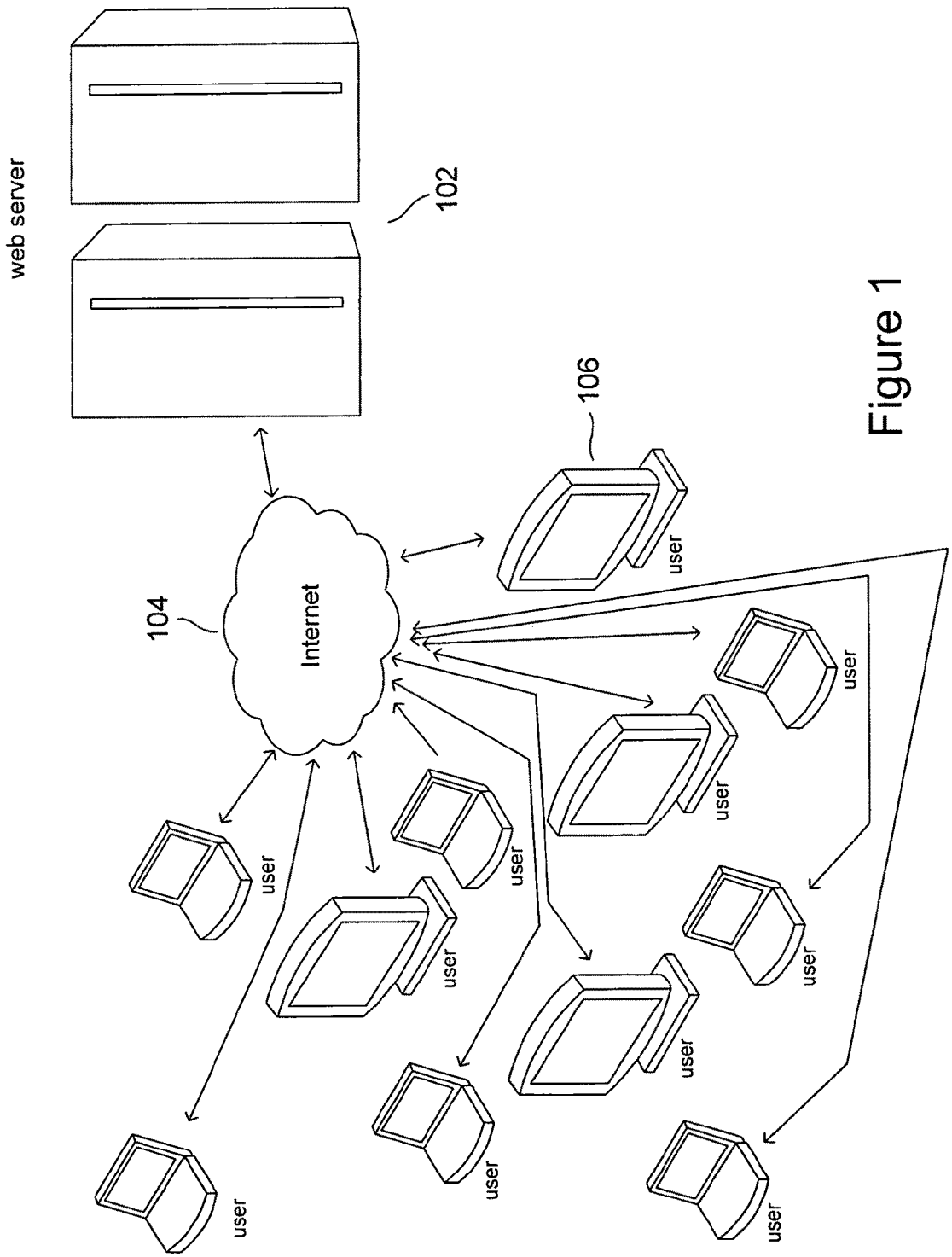
FIG. 1 provides a context for discussion of method and system embodiments of the present invention.

FIG. 1 provides a context for discussion of method and system embodiments of the present invention. In FIG. 1, a server 102, comprising one or more servers and/or other types of computer systems, transmits HTML-encoded web pages through the Internet 104 to a large number of user or customer computers, including as user computer 106. As discussed above, the web server may be owned and operated by an Internet retailing organization, an information-distribution system, a social-networking system, or another type Internet-based transactional or content-distribution system. In general, the web server runs continuously, at all times during the day and night, providing HTML-encoded web pages and, usually, additional types of information and services, including downloads of executable code, scripts, and other such information for specific types of web-based applications.

Figure 2:
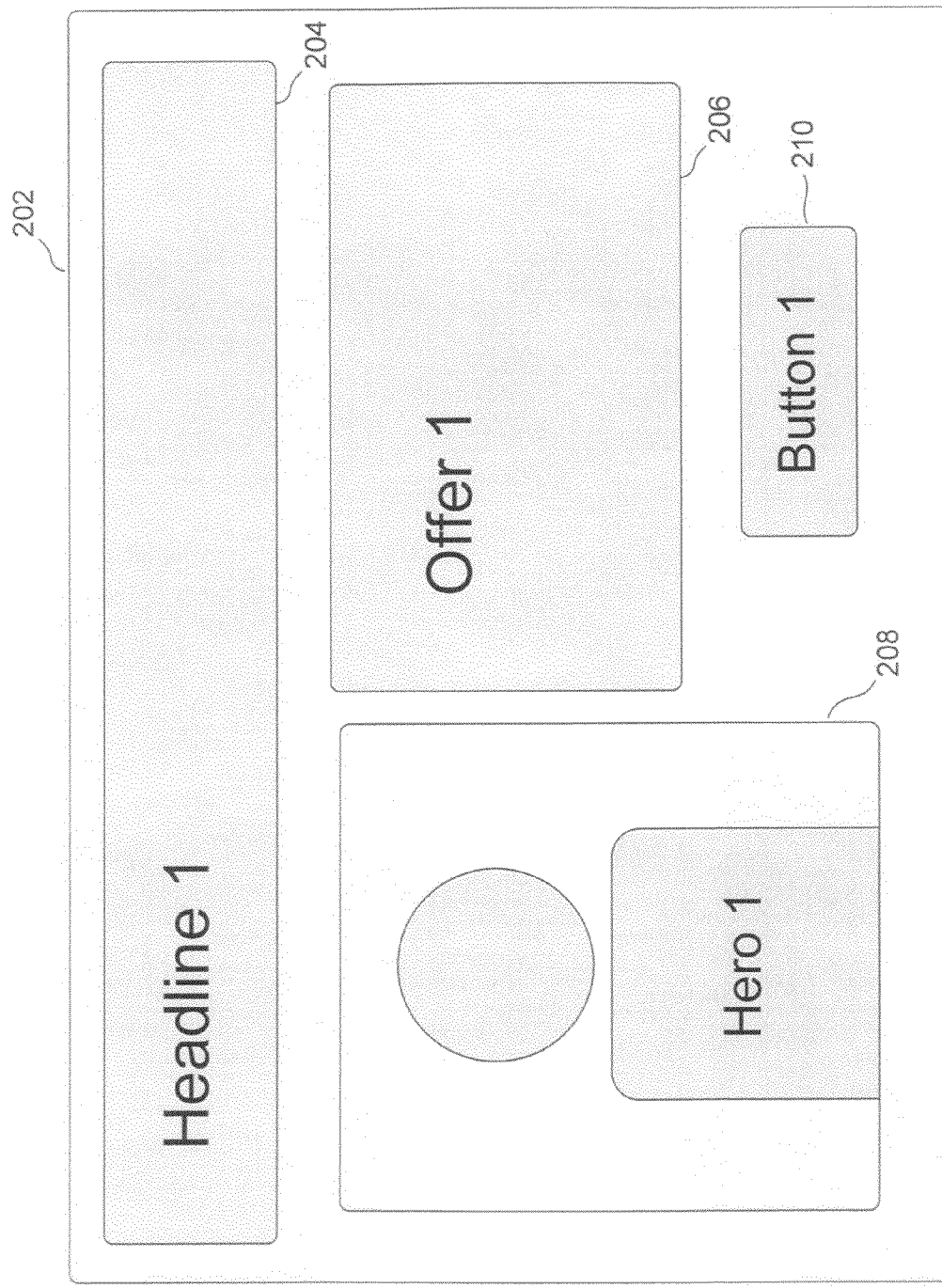
FIG. 2 shows a simple, exemplary web page.

FIG. 2 shows a simple, exemplary web page. A web page is described by an HTML file, discussed below, which is processed by a web browser executing on a computer in order to generate a web page, as shown in FIG. 2, that is displayed to a user on a display device. The exemplary web page 202 includes a headline graphic 204, an offer graphic 206, a hero graphic 208, and a button graphic 210. The exemplary web page is subsequently discussed in the context of tests and experiments in which altered versions of the web page are provided to users of the web server that serves the web page in order to test the effects of modifications to the web page.

Figure 3:
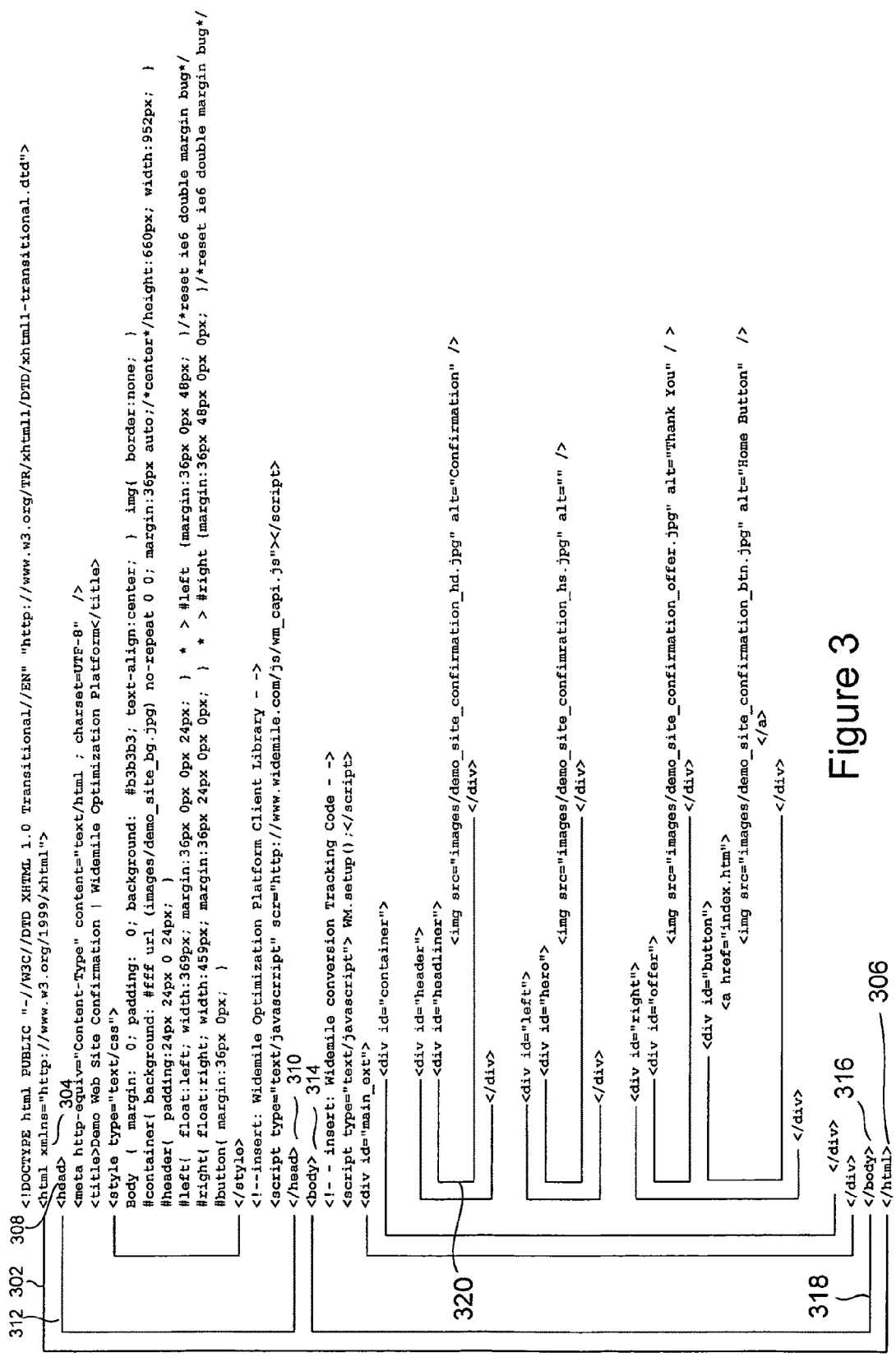
FIG. 3 shows the contents of an HTML file that encodes the exemplary web page shown in FIG. 2 and that includes simple modifications according to embodiments of the present invention.

FIG. 3 shows the contents of an HTML file that encodes the exemplary web page shown in FIG. 2 and that includes simple modifications according to embodiments of the present invention. The modifications, used to virtually incorporate a testing service into a website, according to one embodiment of the present invention, are discussed below, with reference to FIG. 14.

A complete discussion of HTML is beyond the scope of the current discussion. In FIG. 3, portions of the HTML file are correlated with features in the displayed web page shown in FIG. 2. In addition, general features of HTML are illustrated in FIG. 3. HTML is hierarchical, in nature. In FIG. 3, double-headed arrows, such as double-headed arrow 302, have been drawn to the left of the HTML code in order to illustrate tags and tag scoping within the HTML file. In general, HTML statements are delimited by a pair tags, and are hierarchically organized by scope. For example, an outermost statement begins with a first tag of a tag pair that begins with the text "<htmlxmlns=" (304 in FIG. 3) and ends with a last tag of the tag pair that begins with the text "</HTML" (306 in FIG. 3). The scope of outermost statement encompasses the entire HTML code. The double-headed arrow 302 at the left of the HTML code, which represents the scope of this statement, spans the entire HTML file. A second-level that begins with the first tag of a tag pair "<head>" 308 and ends with the last tag of the tag pair "</head>" 310 spans a first portion of the HTML file, as indicated by double-headed arrow 312, and a second statement bounded by the first and last tags of a tag pair "<body>" 314 and "</body>" 316 span a second portion of the HTML file, indicated by double-headed arrow 318. By examining the tags within the exemplary HTML file, shown in FIG. 3, and the double-headed indications of the scope of tag-delimited statements, the hierarchical nature of HTML can be readily appreciated.

Figure 4:
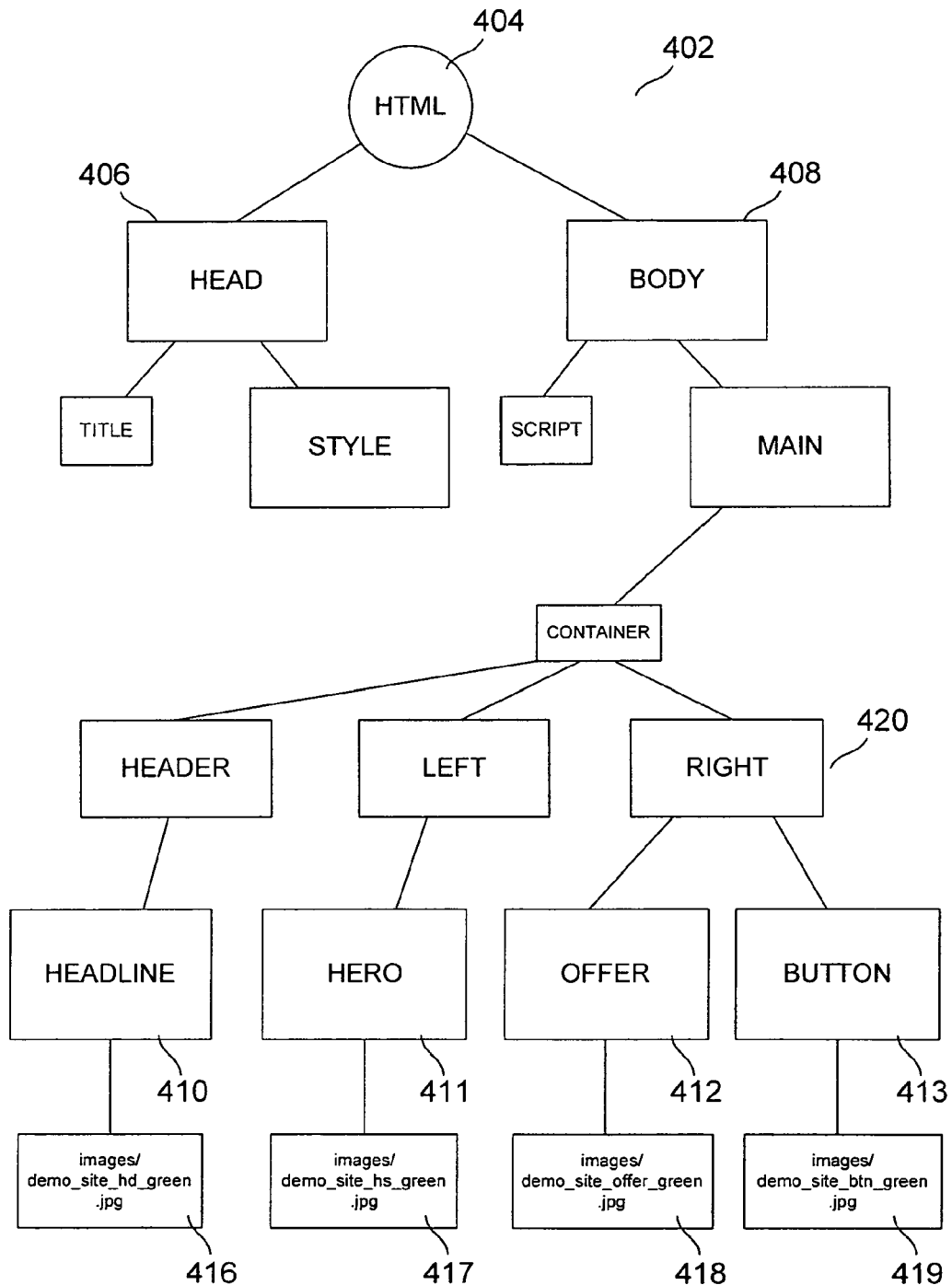
FIG. 4 provides a tree-like representation of the contents of the exemplary HTML file shown in FIG. 3.

FIG. 4 provides a tree-like representation of the contents of the exemplary HTML file shown in FIG. 3. The tree 402 shown in FIG. 4 is constructed from the double-headed arrows that annotate the HTML code, in FIG. 3, that span the scopes tag-delimited statements in the exemplary HTML file. For example, the root node 404 corresponds to double-headed arrow 302, and the second level "head" 406 and "body" 408 nodes correspond to double-headed arrows 312 and 318 in FIG. 3, respectively. Note that, at the very bottom of the tree representation of the HTML file, shown in FIG. 4, the four leaf nodes 416-419 represent the four features 204, 206, 208, and 210 of the displayed web page encoded by the exemplary HTML file, shown in FIG. 2. Each of these nodes is essentially a reference to an image file that contains a jpeg image of the corresponding web-page feature. The head statement, represented by node 406 in FIG. 4, includes formatting information, references to highest-level resource-location directories, and a great deal of additional information that is used by a browser to plan construction of a displayed web page. The body statement, represented by node 408 in FIG. 4, includes references to image files, text, and other features that are rendered by the browser into displayed features of the web page. Intermediate nodes include identifiers, particular metdata information, and references to scripts that are downloaded and run by the web browser during web-page rendering and/or display.

As a specific example, node 416, a direct and only descendant of the node labeled "headline" 410 in FIG. 4, corresponds to the headline feature 204 displayed in the exemplary web page shown in FIG. 2. This node also corresponds to double-headed arrow 320 in FIG. 3. The statement "<img src="images/demo_site_hd_green.jpg" indicates that the displayed object is encoded as a jpeg image "demo_site_offer_green.jpg" that can be found in a file-system sub-directory "images."

In order to transform an HTML file into a displayed web page, a web browser constructs a tree-like binary-encoded data object referred to as a "document object model" ("DOM.") The exact contents and structure of a DOM is beyond the scope of the present invention. However, method and system embodiments of the present invention rely on standardized DOM-editing interfaces that provide routines to identify nodes and subtrees within a DOM and to edit and modify identified nodes and subtrees. Once a browser has created a DOM from the exemplary HTML file shown in FIG. 3, DOM-editing routines can be used to locate the node in the DOM corresponding to the node "headline" 410 in FIG. 4 and replace or modify that node to reference a different image. Following modification, the web browser would then display a modified web page in which the headline image 204 in FIG. 2 is replaced by a different image. To effect more dramatic changes, an entire subtree of a DOM, such as the subtree rooted by a node corresponding to the node "right" 420, can be removed or replaced, to change groups of display features. While the embodiment of the present invention, discussed below, uses DOM tree modification techniques, other types of modification techniques provided by interfaces to other types of binary representations of web pages may be used, in alternative embodiments of the present invention. The DOM is only one of many possible binary representations that may be constructed and employed by web browsers.

Another feature of the exemplary HTML file shown in FIG. 3 is that the various features displayed in FIG. 2 are, in HTML, wrapped by tag-delimited identifiers. For example, the "wm_headline" tag indicated by double-headed arrow 320 and by node 410 in FIG. 4 is an identifier for the headline-image-reference statement 322. Alphanumeric identifiers, such as the identifier "wm_headline," are introduced into an HTML file in order to give easy-to-understand and easy-to-use labels or handles for various objects, particularly objects that correspond to displayed features in a web page. Although objects can be easily identified in this manner, other methods for identifying objects within an HTML file, as well as corresponding nodes of DOM trees and other such binary representations of a rendered page, can be used to reference display objects.

Figure 5:
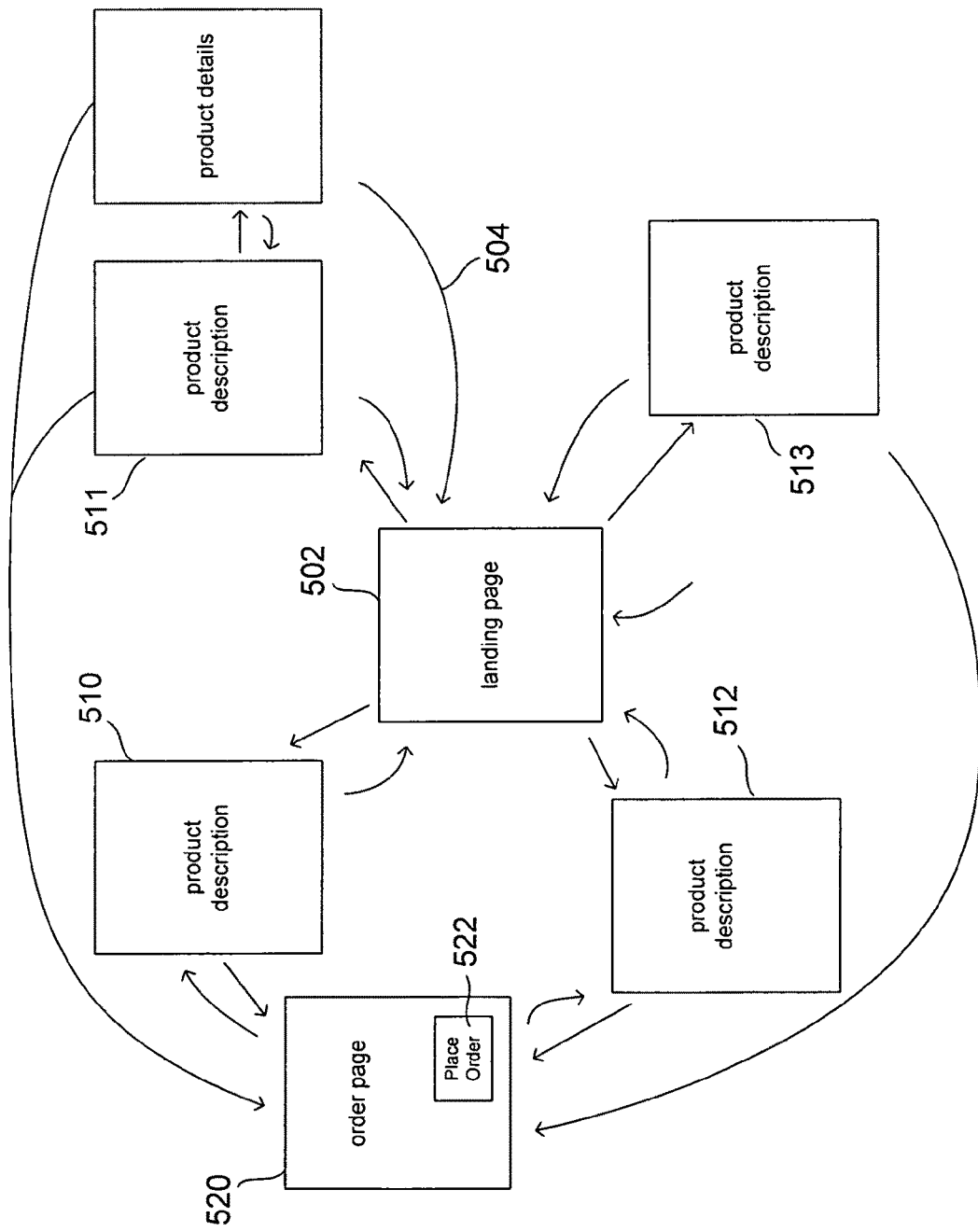
FIG. 5 illustrates a simple web site comprising seven web pages.

FIG. 5 illustrates a simple web site comprising seven web pages. Each web page, such as web page 502, is represented by a rectangle in FIG. 5. Curved arrows, such as curved arrow 504, indicate navigational paths between the web pages. Accessing the web site illustrated in FIG. 5, a user generally first accesses a landing page 502 as a result of clicking a link provided by another web page, such as a web page provided by a search engine, or provided in a list of bookmarked links by a web browser. The landing page is often, but not necessarily, a home page for the website. A home page is a central portal for access to all of the remaining web pages in the web site. In general, a user navigates through the web site by clicking on displayed links embedded in web pages. For example, the web site illustrated in FIG. 5 is a retailing web site. The landing page provides links to four different pages 510-513 that provide product descriptions for four different products. A user, after viewing the landing page 502, may click a link in order to navigate to a display of a product-description page 510. In the exemplary web site shown in FIG. 5, a user may subsequently navigate from a product-description page or product-details page to a central order page 520 that contains a button or feature 522 to which the user can input a mouse click in order to order one or more products. In certain cases, web sites may comprise a single page and, in other cases, a web site may comprise tens to hundreds or more pages, linked together in a network-like graph describing various navigational paths between web pages.

An example application of web-site testing would be to monitor access, by users, of the web pages shown in FIG. 5 in order to attempt to determine how often users end up navigating to the order page and clicking the place-order button 522. One might then modify one or more of the pages, and again monitor users' access to the pages and subsequent input to the place-order button 522. In this way, by testing collective user response various alternative web pages, web-site developers and managers may be able to determine an optimal set of web pages that provides the highest ratio of inputs to the place-order button 522 to user accesses of the landing page 502. In testing parlance, clicking the place-order button 522, in the exemplary web site shown in FIG. 5, is, in this example, considered to be a conversion event. One goal of optimizing the web site might be to increase the percentage of users clicking on the place-order button 522 after initially accessing the landing page 502. However, conversion events may be arbitrarily defined, and there may be multiple conversion events for a particular web site. Optimization of a web site may also involve multiple, often at-least partially contradictory goals. One goal may be to increase the number of accesses to any page other than the landing page by users who have initially accessed the landing page. Another goal may be to increase total accesses to the landing page, regardless of subsequent page accesses by users accessing the landing page. Another goal may be to obtain maximum possible conversion rates, even at the expense of decreasing the overall rate of page accesses.

Figure 6:
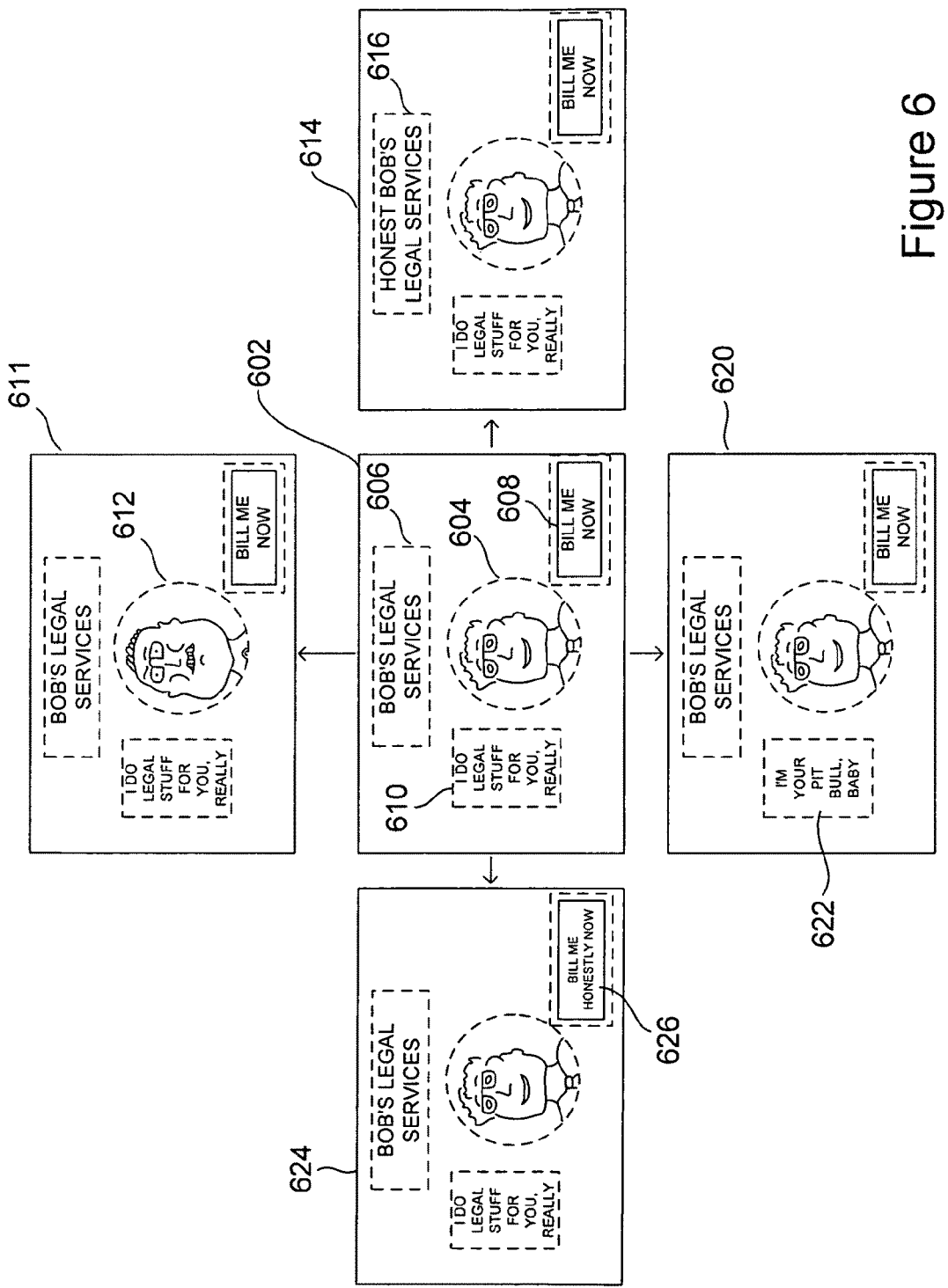

FIGS. 6-7 illustrate factors, factor levels, and test design according to embodiments of the present invention. In FIG. 6, an initial, prototype web page 602 is shown. A web-site owner or developer may decide to systematically alter the prototype web page in order to test the effects of the systematic alterations, so that alterations that appear to maximize goals can be made to the web page in order to optimize the web page. The prototype web page includes a portrait image 604, a title 606, a user-input feature 608, and an informational message 610. A systematic tester may decide to alter each of these web-page features, one-at-a-time, in order to determine the effects of the altered features on measured user response. For the web page shown in FIG. 6, the measured user response, or conversion event, would likely be user input to the user-input feature 608. As shown in FIG. 6, a tester may devise a first test web page 611 in which the prototype image 604 is replaced with a different image 612. The tester may devise a second test page 614 in which the title feature 606 is replaced with a different title feature 616. Similarly, the tester may devise a third test page 620 in which the informational message 610 of the prototype web page is replaced with a different informational message 622. Finally, the tester may create a fourth test web page 624 in which the user-input feature 608 of the prototype web page is replaced with a differently labeled user-input feature 626. The systematic tester may change a single feature, in each of the four test pages, in order to judge the effect of changing that feature in isolation from any other changes to the web page that might be contemplated. However, the strictly one-feature-change-at-a-time method would fail to provide data for the effects of various combinations of changes, such as changing both the headline and a portrait and, moreover, would require significant developer time and effort.

FIG. 7 illustrates a related approach to the testing approach discussed with reference to FIG. 6 that represents one embodiment of the present invention. In FIG. 7, the tester has prepared a table of factors and factor levels. Each factor in the table is represented by a column, such as the first column 702 corresponding to factor 1. Each factor is a feature, or group of related features, on a displayed web page that the tester wishes to alter in order to determine whether or not to alter the feature in order to optimize the web page with respect to one or more optimization goals. The various alternatives for each factor are referred to as levels. Thus, for example, factor 1, represented in the table by column 702, corresponds to the information message (610 in FIG. 6), for which the tester has devised six different alternatives, each corresponding to one of six different levels associated with that factor. The tester has devised four alternatives for factor 2, the title feature (606 in FIG. 6), five alternatives for factor 3, the portrait feature (604 in FIG. 6), and five alternatives for the fourth factor, the user-input feature (608 in FIG. 6). Then, having specified the factors, or web-page features, to be altered, and the various different alternatives for each feature, the tester might try generating all possible test pages corresponding to all possible combinations of level values for the factors in order to test the different alternative web pages to determine an optimal set of four levels corresponding to optimal alternatives for the four factors. Unfortunately, an exhaustive, combinatorial test, in most cases, is not feasible. Even for the very simple example of FIGS. 6 and 7, there are 1260 different alternative pages, including the prototype page, which can be constructed by varying between one and four factors according to the variations, or levels, provided in the table provided in FIG. 7. In general, for the statistics collected from testing to have significance, a sufficient number of tests need to be conducted so each of the different test pages is displayed a relatively large number of times during the test. In the example of FIGS. 6 and 7, each different alternative web page among the 1260 possible alternative web pages may need to be displayed hundreds or thousands of times to users in order to accumulate sufficient test data to make valid statistics-based judgments. In many cases, the number of factors and number of levels for each factor may be far larger than in the simple example shown in FIGS. 6 and 7.

The variations of factors, or levels, may include changes in content, display size, display color, object position in the displayed image, or many other different types of changes. Again, as discussed above, a factor may include multiple display features.

Because of the general infeasibility of full, exhaustive, combinatorial testing of all possible web-page variations, certain method and system embodiments of the present invention use an experimental-design method referred to as "the orthogonal-array method." This method devises a non-exhaustive test strategy that nonetheless gathers sufficient, well-distributed test data in order to make reasonable inferences with regard to the effects of altering the factors in all possible ways. In essence, the orthogonal-array method involves devising a sparse sampling of all possible variations of the web page that provides information about the various dependencies between the different levels of the different features. The orthogonal-array method involves specifying the factors and specifying the levels for each factor for a particular test run, and then, based on the factors and levels for each factor to be tested in a particular test run, devises a set of alternative web pages, by varying the specified factors according to the specified levels, that provide a good basis for collecting statistics for the features to be tested. The orthogonal-array method is well known in testing and statistics. Many additional types of test-design methods may also be used. Whatever test-design technique is employed, each test run defined by clients is associated with a test design that controls generation and distribution of experiments, or modified web pages.

Figure 8:
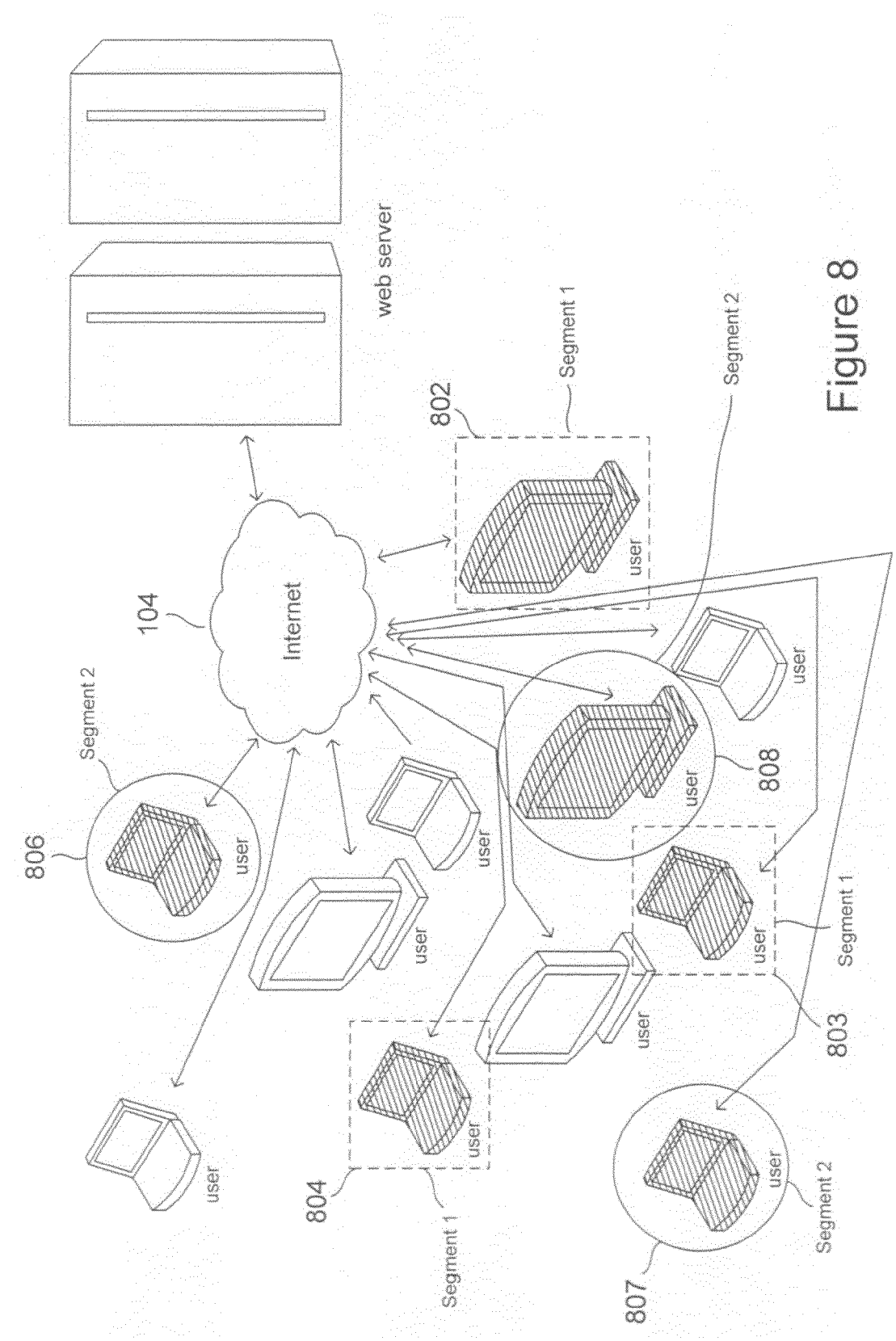
FIG. 8 illustrates the concept of segments in testing of web pages.

FIG. 8 illustrates the concept of segments in testing of web pages. FIG. 8 shows the web server and users of the web server using the same illustration conventions as used in FIG. 1. However, in FIG. 8, a first set of three users 802-804 are marked as belonging to a first segment, segment 1, and a second set of three users 806-808 are marked as belonging to a second segment, segment 2. During live, real-time testing of web sites, according to embodiments of the present invention, alternative versions of web pages are provided to subsets of the total number of users, or customers, accessing the web server. During a particular test run, altered web pages are provided to a specified segment of users. A segment of users, or customers, can be defined by any of a wide variety of different parameters. For example, a segment of users may be defined by the web page or link by which the users or customers navigated to a test page served by the web server. Segments may be defined by time periods, by the Internet domains through which users access the Internet, or by many other different criteria.

Figure 9:
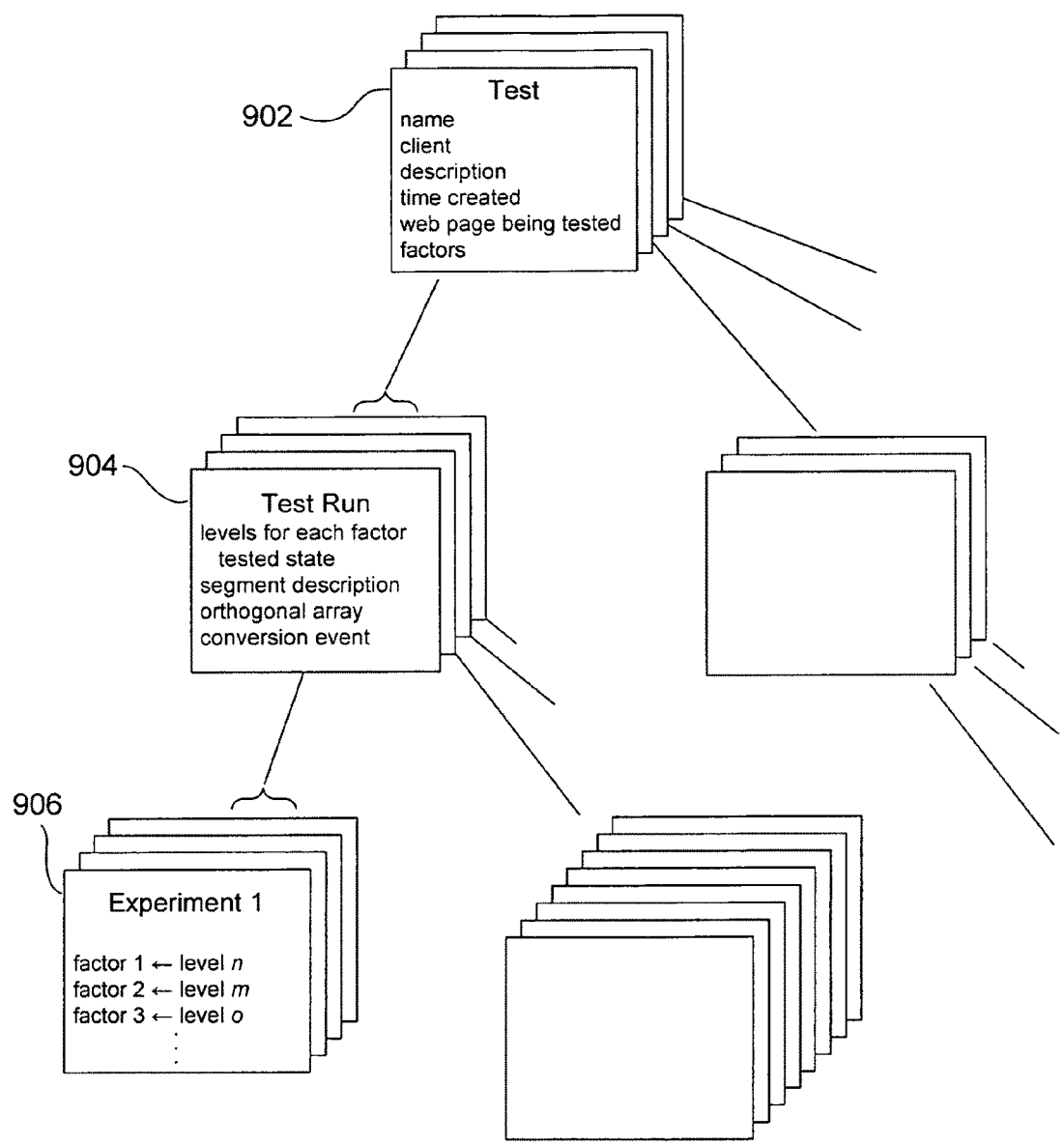
FIG. 9 illustrates the data and data structures that define tests, test runs, and experiments according to embodiments of the present invention.

FIG. 9 illustrates the data and data structures that define tests, test runs, and experiments according to embodiments of the present invention. A testing service may, at any given time, carry out a large number of different tests for many different client web-site-based organizations. Each test is defined by a test record, such as test record 902 in FIG. 9. Information contained in the test record includes an alphanumeric name of the test, an identifier for the client on behalf of whom the test has been created, a description of the test, an indication of the time that the test was created, an indication of the web page that is tested by the test, and a list of the factors that may be involved in any particular test run associated with the test. Note that the factors can be specified by the identifiers associated with features or objects displayed in the web page. For example, referring to FIGS. 2-4, a list of factors for a test of the exemplary web page shown in FIG. 2 may include the alphanumeric strings: "wm_headline," "wm_hero," "wm_offer," and "wm_button."

Any particular test may be carried out over a series of test runs. For example, each test run may be carried out at a different time, with respect to a different segment of users, and may test a different array of features and feature levels. Thus, each test record, such as test record 902 in FIG. 9, may be associated with one or more test-run records, such as test-run record 904 in FIG. 9. Test-run records include information such as the levels to be used for each factor, with the levels specified as URLs, or other references to images and other resources, or as text strings or other data directly displayed by the browser, a current state of the test run, a description of the segment to which the test run is directed, an indication of the particular orthogonal-array basis or other test design for the test run, and an indication of one or more conversion events for the test run. Finally, using the orthogonal-array basis or other test design selected for the test run, a test run is associated with a set of experiments, such as experiment 906 in FIG. 9. Each experiment corresponds to an altered web page that is displayed to users during the test run. An experiment is essentially defined by associating each factor, tested in the test run, with a particular level, or referenced resource, according to a matrix of test pages generated by the orthogonal-array basis or other test design selected for the test run.

Figure 10:
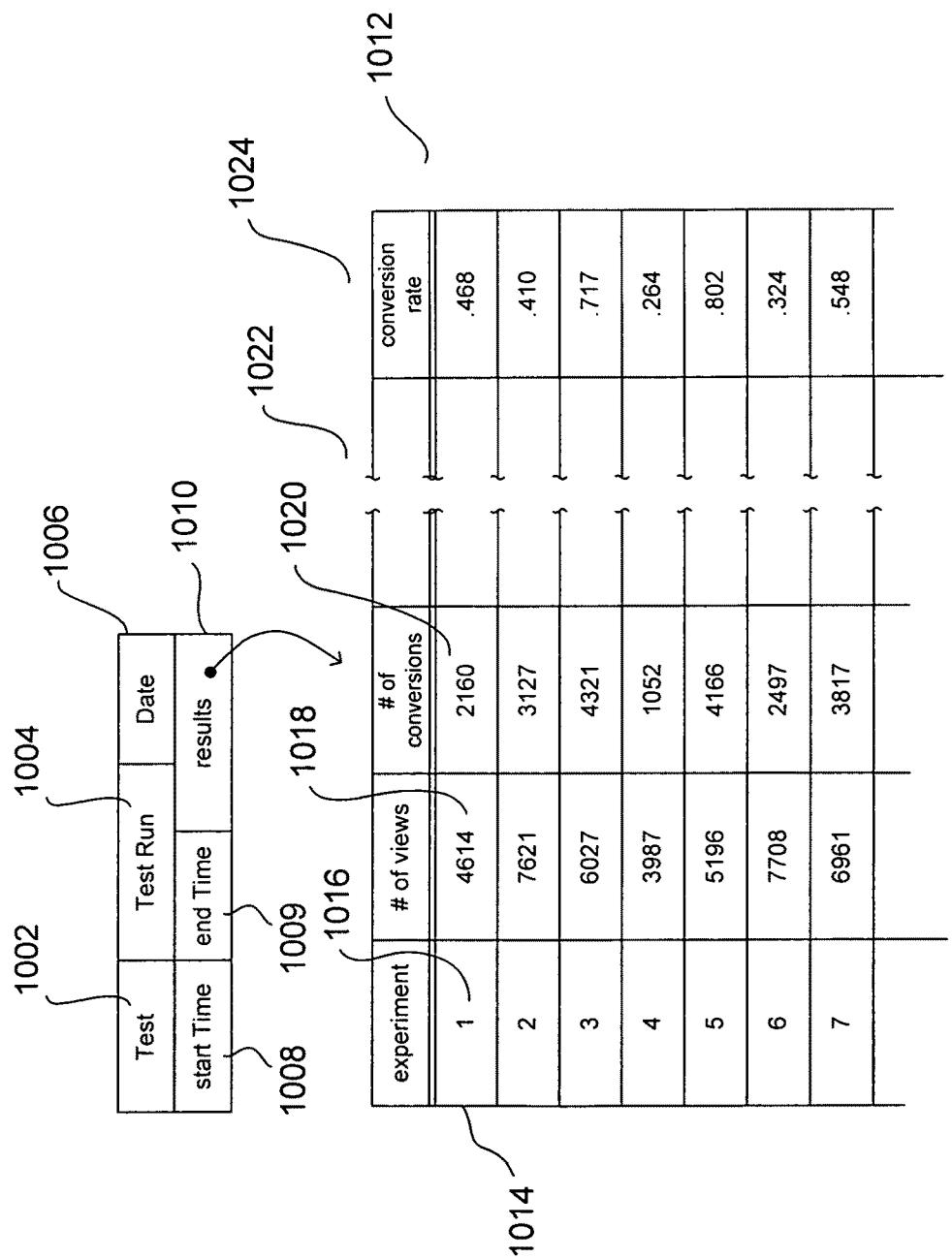
FIG. 10 illustrates the nature of the statistics, or test results, that are collected for a particular test run according to embodiments of the present invention.

FIG. 10 illustrates the nature of the statistics, or test results, that are collected for a particular test run according to embodiments of the present invention. The results include indications of the test 1002 and test run 1004, the date on which the test run was conducted 1006, a start time and an end time for the test run 1008-1009, and a reference 1010 to a results table 1012 in which test results are tabulated. The test results table includes a row for each experiment associated with the test run, such as row 1014 in experimental-results table 1012. The row includes an indication of the experiment to which the row corresponds 1016, a count of the number of the times that the page corresponding to the experiment was accessed by a user of an active segment 1018, an indication of the number of times that a user who accessed the test page generated a corresponding conversion event 1020, other similar numerical information in additional columns 1022, and, finally, a computed conversion rate 1024 for each experiment. The test results shown in FIG. 10 are but one example of the type of statistics and data that can be collected during a test run according to method and system embodiments of the present invention. Different or additional statistics may be collected by different embodiments of the present invention, or according to different test configurations created by test-service clients.

There are many different possible ways of testing a web server in order to accumulate test results, discussed above with reference to FIG. 10, for tests defined for particular web pages and factors associated with those web pages, as discussed above with reference to FIG. 9. One method would require the web server to design a test by creating all or a subset of possible alternative test pages and to then develop a test-page-serving system that would execute concurrently with, or as part of, the web server on an intermittent or continuous basis. As discussed above, testing methods and systems that require the web server to develop and run tests may be prohibitively expensive, both in time and resources, for web-site owners or web-site-based organizations. Furthermore, such testing methods can inadvertently cause serious financial losses and other non-financial damage to a web site. For example, were the test pages improperly constructed or served, sales or other activities generated by real-time users may be lost and, in worst cases, the web site could potentially lose business from particular customers and users altogether. Real-time testing additionally involves significant security risks. A malicious hacker or employee might be able to alter the test system to display fraudulent or offensive test pages, for example. Finally, similar to problems encountered in a variety of physical and behavioral systems, poorly or improperly design tests may so perturb the system being tested that the statistics collected from the tests are meaningless or, in worst cases, lead to false conclusions. For example, a poorly designed test engine may introduce significant delays in web-page service to customers or users. As a result, the conversion rate measured during a test run may fall precipitously, not because of particular alterations made to test web pages, but instead because of the significant time delay encountered by users for whom the test page is constructed and to whom the test web page is transmitted. For these, and many other reasons, web-site-based-organization test design and execution can be undesirable and, in worst cases, disruptive and damaging to the web-site-based organization.

An alternative approach, to which method and system embodiments of the present invention are directed, involves using a third-party testing service, in tandem with the web server that serves the web site to be tested. However, simply conducting tests by a third-party server does not guarantee that the many pitfalls and disadvantages discussed above with respect to web-site-based-organization test design and execution are necessarily avoided. In fact, in many cases, the pitfalls and disadvantages discussed in the preceding paragraph may be exacerbated by third-party testing of web sites and web servers. For example, in the case that a test web page, requested by a customer, needs to be prepared by the third-party server, in response to a request generated by the web site as a result of a user request for the web page being tested, test-page serving may be significantly delayed, deleteriously perturbing the users' interaction with the web server to the point that the test statistics end up meaningless or misleading. As another example, security issues may be compounded by distributing testing tasks between a web-server computer system and a third-parting testing server. Method and system embodiments of the present invention employ an array of techniques and features that address these pitfalls and disadvantages, and that provide minimally intrusive and cost-effective testing for web sites and web servers.

Figure 11:
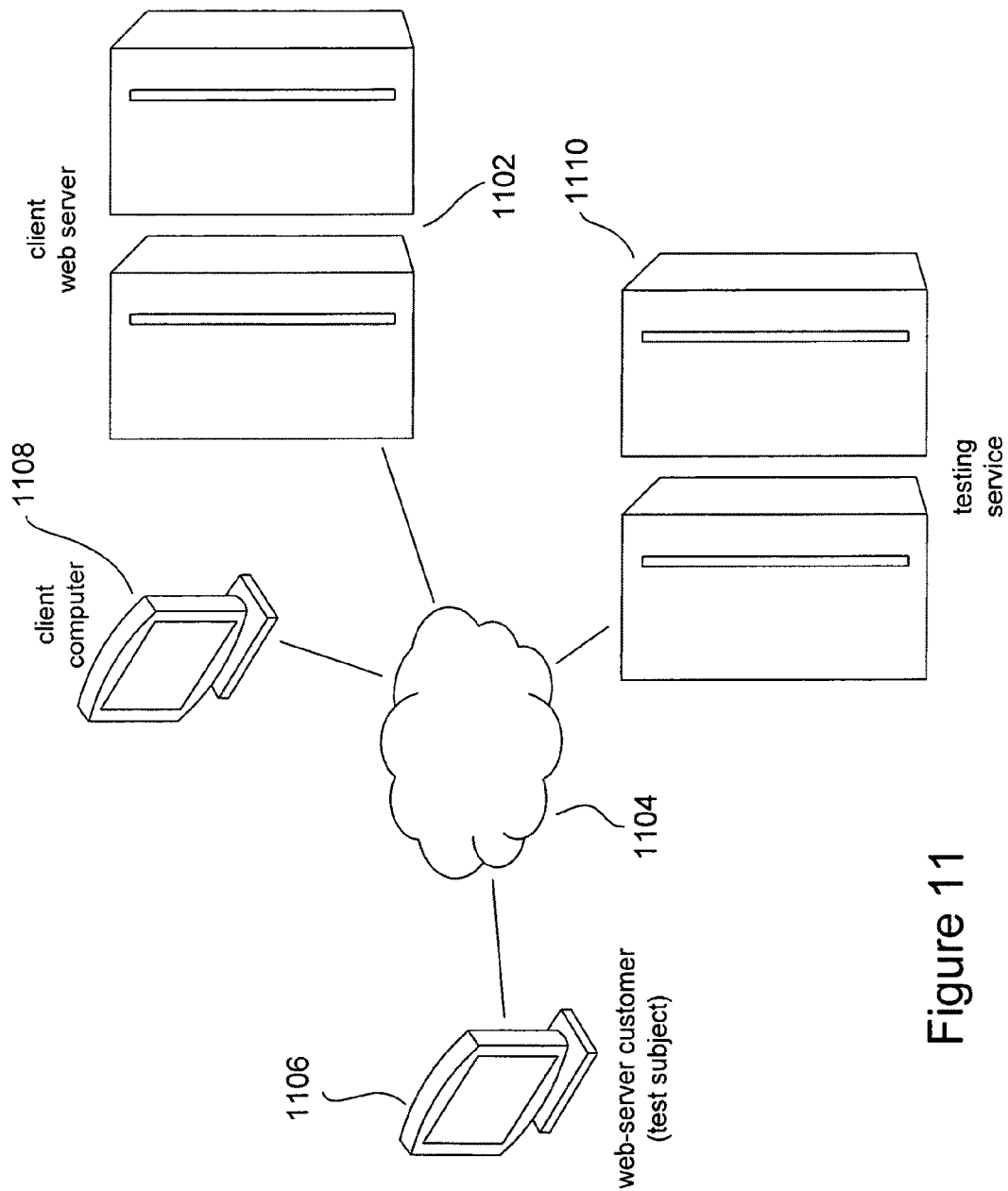
FIG. 11 illustrates the testing environment used by certain method and system embodiments of the present invention to carry out web-site testing.

FIG. 11 illustrates the testing environment used by certain method and system embodiments of the present invention to carry out web-site testing. In FIG. 11, the web site 1102 is represented as one or more servers or large computer systems that serve web pages through the Internet 1104 to a generally large number of web-site users or customers, including user 1106. The web site or web server is regarded, in the following discussion, as a client web server of the testing service. The client web server also includes a client computer 1108 by which the client web-server-based organization can access various third-party services and web servers through the Internet. Finally, a web-site testing service is provided by, in the embodiment of the present invention shown in FIG. 11, a distinct server or servers 1110 accessible to the client web server 1102, the web server customer 1106, and client computer 1108 via the Internet 1104.

The testing service is used by the client web-site-based organization, referred to as the "client," below, to design and run real-time, live tests of web pages provided by the client web server to users. In certain embodiments of the present invention, the testing service may run on the same computer systems as the client web server. In general, the testing service is geographically distinct from the client web server, and is concurrently used by multiple, different clients for concurrently executing many different test runs on behalf of the multiple clients.

FIGS. 12A-H illustrate the general method and system for web-site testing that represents one embodiment of the present invention. FIGS. 12A-H all use the same illustration conventions, in which large rectangles represent the four entities shown in FIG. 11.

Figure 12A:
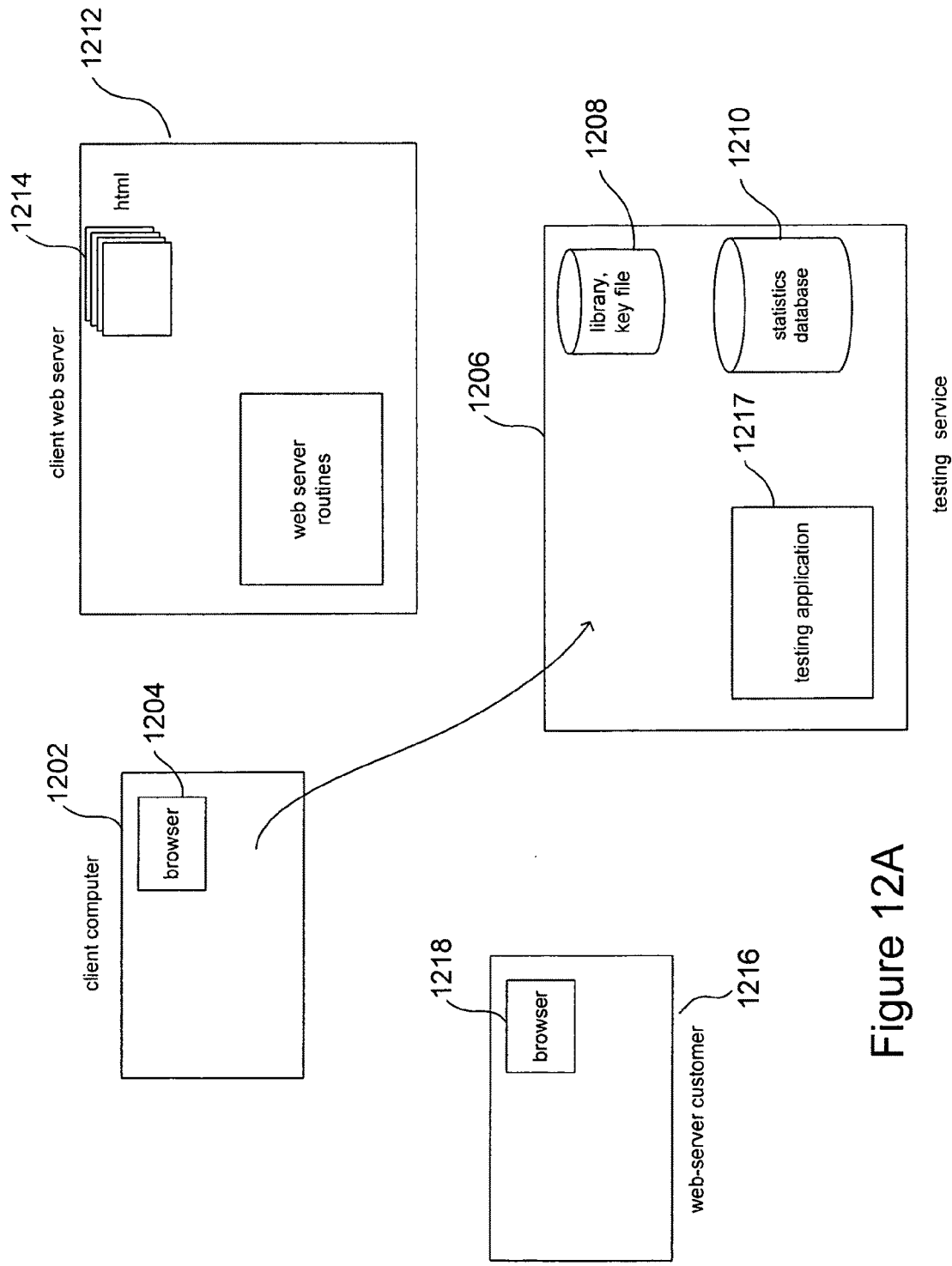
FIGS. 12A-H illustrate the general method and system for web-site testing that represents one embodiment of the present invention.

A client establishes a relationship with the testing service, as shown in FIG. 12A, by accessing the testing service through a browser executing on the client computer. As shown in FIG. 12A, an employee or owner of the client web server uses the client computer 1202 to access a testing-service web site, via a browser 1204 running on the client computer, which allows the client web server to register as a client of the testing service. The testing service 1206 includes one or more databases 1208 and 1210 that store information used to construct library and key files that are downloaded to client web servers, store statistics collected during testing, and store various different data objects and records that describe clients, tests, test runs, experiments, and other data used to conduct web-site testing. The client web server 1212 serves a number of different web pages described by HTML files 1214 to users, represented by user 1216 who access the web pages served by the client-web server through a browser 1218 running on the customer computer 1216. The testing service and client web server additionally include web-server engines, application programs, and other components of servers and computer systems (1215 and 121 in FIG. 12A).

Figure 12B:
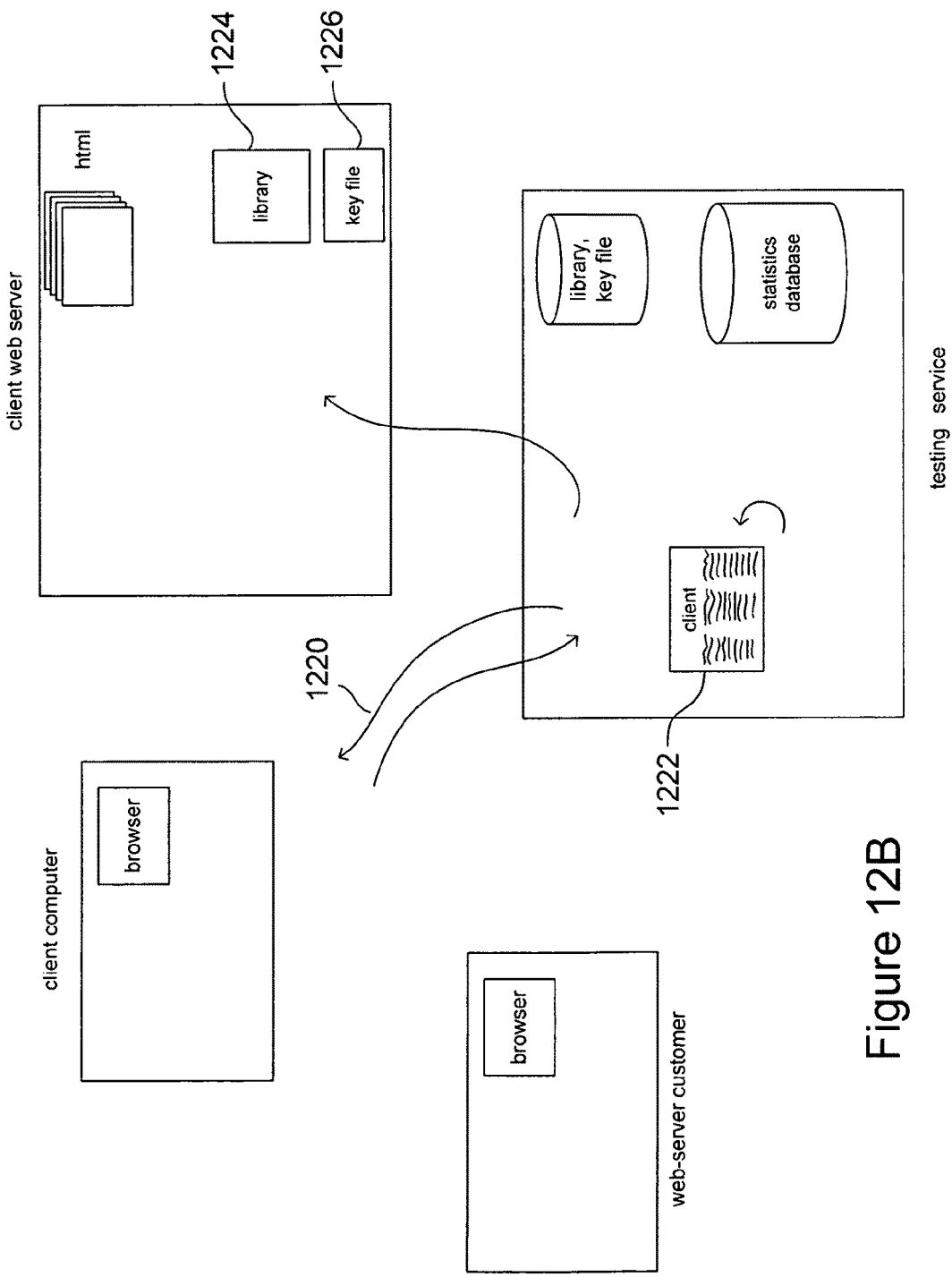

As shown in FIG. 12B, the client carries out a dialog 1220 with the testing service in order to provide the testing service with information about the client that allows the testing service to prepare a client record or records 1222 that describe the client and to store the client record or records in the database. In addition, the testing service may undertake various authorization and authentication steps to ensure that the client web server is a valid web server and that the client can transmit remuneration for testing services to the testing service. As part of client initialization, the testing service prepares a script library 1224 and a key file 1226 that the testing service downloads to the client web server. The script library 1224 includes routines that are called by client-web-server users during web-site testing. This library is referred to as a "script library" because script routines are often provided to browsers for execution. However, other types of routines may be provided by other types of libraries in alternative embodiments of the present invention. The key file 1226 includes cryptographic information that ensures that all information exchanges that occur between client users and the testing service are secure.

Figure 12C:
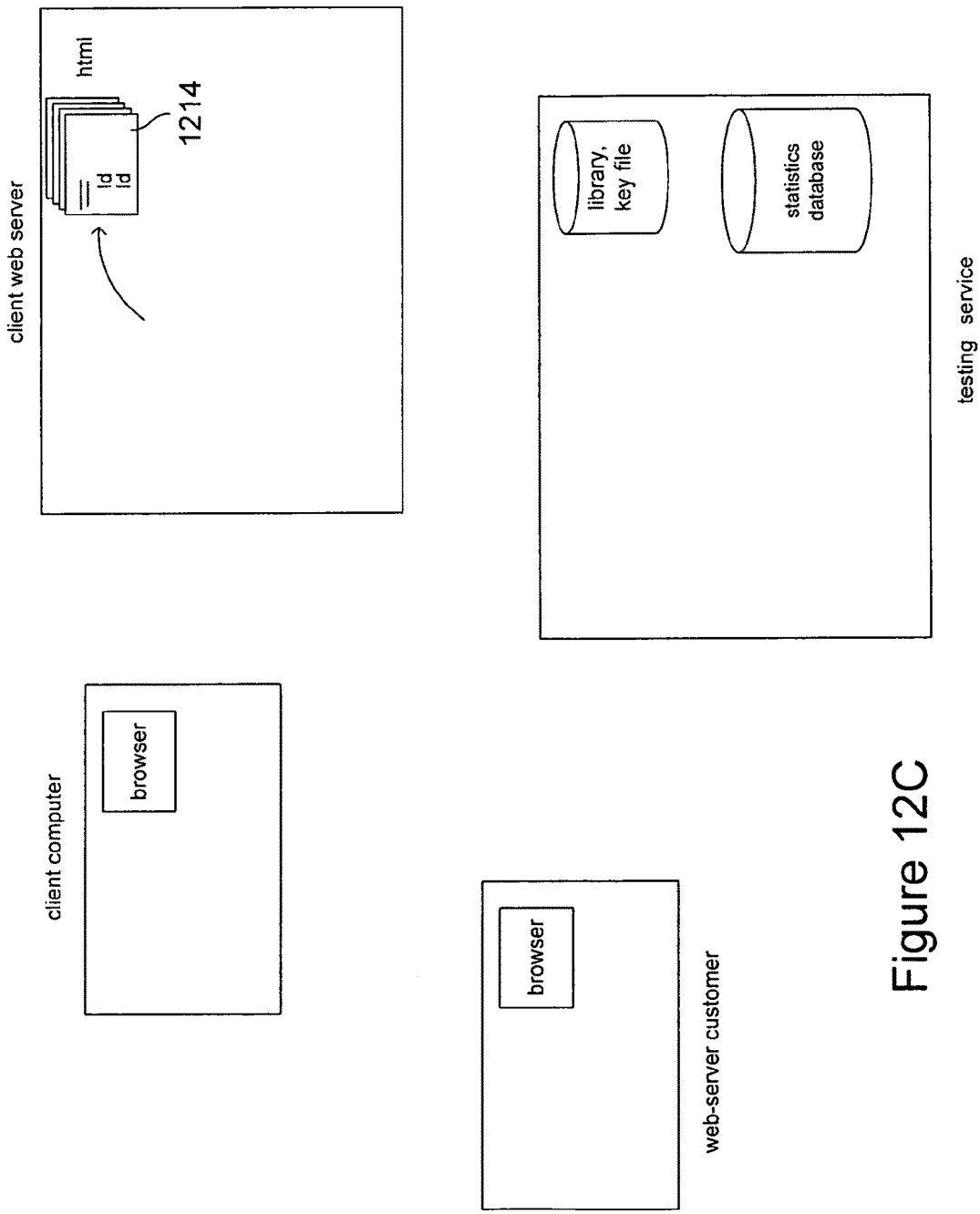

As shown in FIG. 12C, following client initialization, the client modifies any of the HTML encodings of web pages that may be altered during testing of the client-web server by the testing service. The alternations are minimal. To each HTML file that encodes a web page that may be tested, the client generally adds only two single-line statements and, in the case that display objects are not associated with identifiers, as discussed above with reference to FIG. 3, the client web server provide identifiers for each of the objects that may be specified as factors for testing of web pages. The single-line statements are generally identical for all client web pages, greatly simplifying the web-page modification carried out by the client. The first statement results in downloading of a script library from the client web server, and the second script launches one or more information exchanges between the testing server and user computer. In the case that a conversion event is tied to a specific user-activated display device, such as a button, a call to a conversion script is inserted into the HTML file, so that user activation of the user-activated display device generates an information-exchange transaction with the testing service corresponding to a conversion event. As discussed above, these may be the HTML identifiers discussed with reference to FIG. 3, or other types of identifiers. In many cases, simple changes to the HTML files can be automatically carried out by a script or by routines provided by a content-management-service application-programming interface.

Figure 12D:
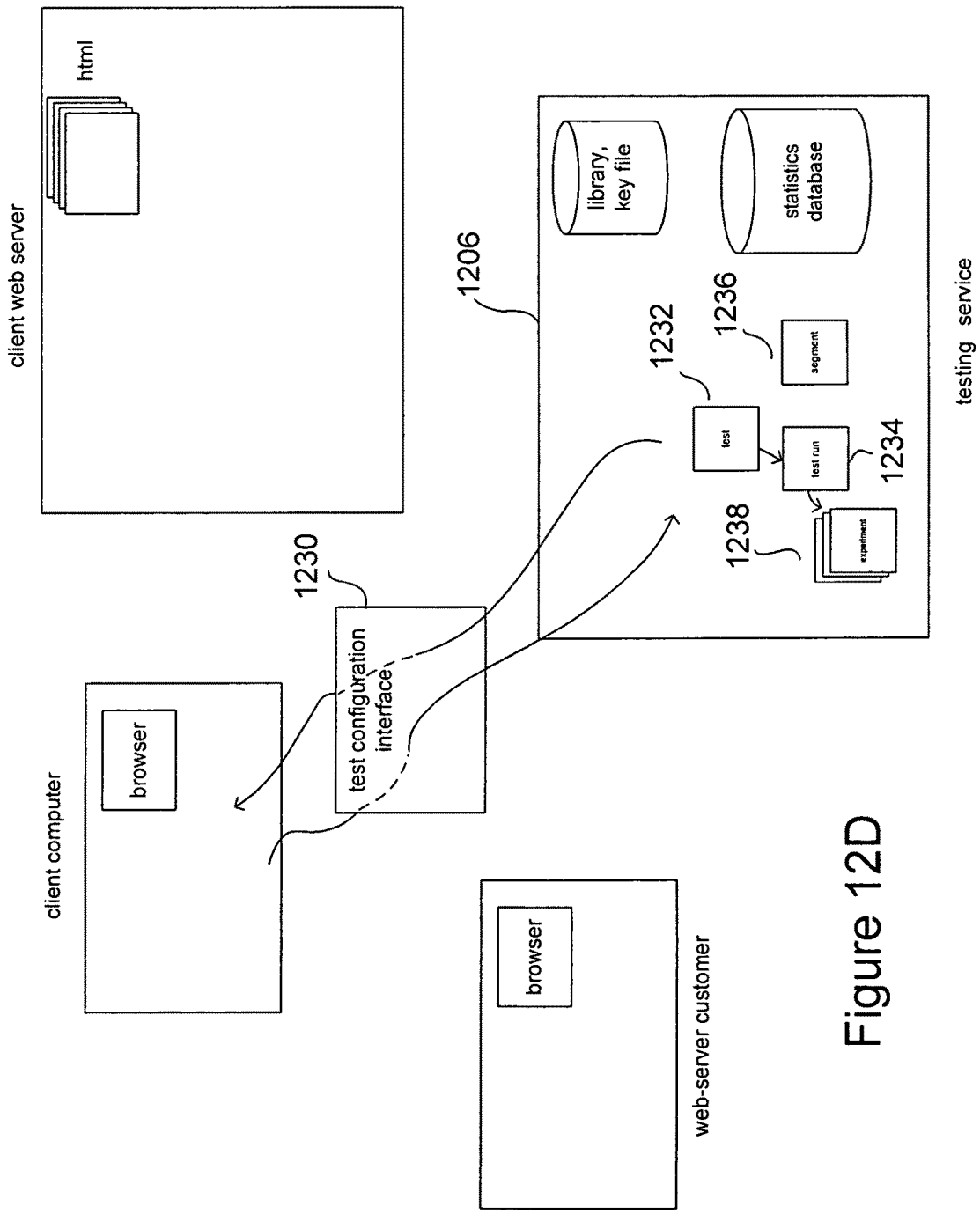

Following client initialization and modification of the HTML-file encodings of web pages that may be subsequently tested, the client can configure and run tests through a test-configuration interface provided as a website by the testing service to clients, as shown in FIG. 12D. The test configuration interface 1230 allows the client computer to define tests 1232, specify and modify already-specified test runs 1234, and specify segments 1236, and, using client-supplied test and test-run specifications, the testing service generates the experiments 1238 associated with each test run. All of the test, test-run, and segment information is stored in records associated with a reference to the client in one or more databases within the testing service. The test-configuration interface 1230 additionally provides run-time information to the client web server and allows the client web server to launch trial runs and test runs.

When a client web server has created a test and launched a test run for the test, the testing service provides modifications of the tested web page to users of the client-web-server during the test in order that the users receive altered web pages that constitute test experiments, and the testing service collects statistics based on users' access to web pages under test. This process is next described, with reference to FIGS. 12E-G.

Figure 12E:
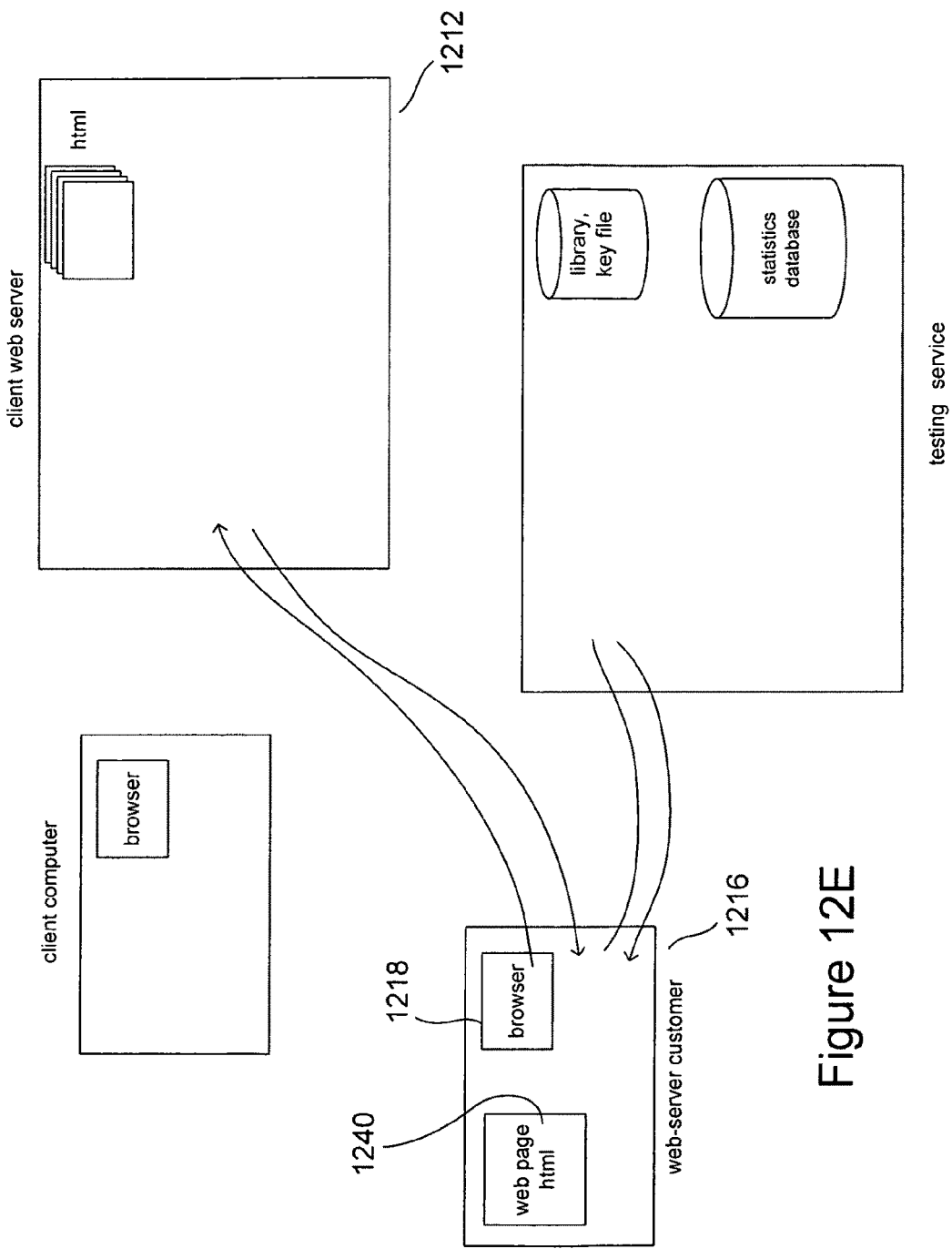

When a client-web-server user 1216 accesses a test web page, the client-web-server user sends an HTML-file request through the Internet to the client web server 1212, as shown in FIG. 12E, which returns the requested HTML page to the client-web-server user 1216 for rendering and display by the browser 1218 executing within the user's computer. As the browser begins to process the HTML file, the browser encounters a statement 1240 that causes the browser 1218 to request the script library from the client web server. When the script library is downloaded by the client web server, the HTML file is modified, on the user computer, to launch an additional information exchange with the testing service to download additional library routines from the testing service. This additional information exchange is carried out only when the web page being processed is an active test page, the user computer is a valid test subject for an active test, and the additional library routines are not already cached in the user computer's browser. Insertion of the library-routine-fetch statement is one of the two modifications to the HTML files corresponding to tested web pages made by the client.

Figure 12F:
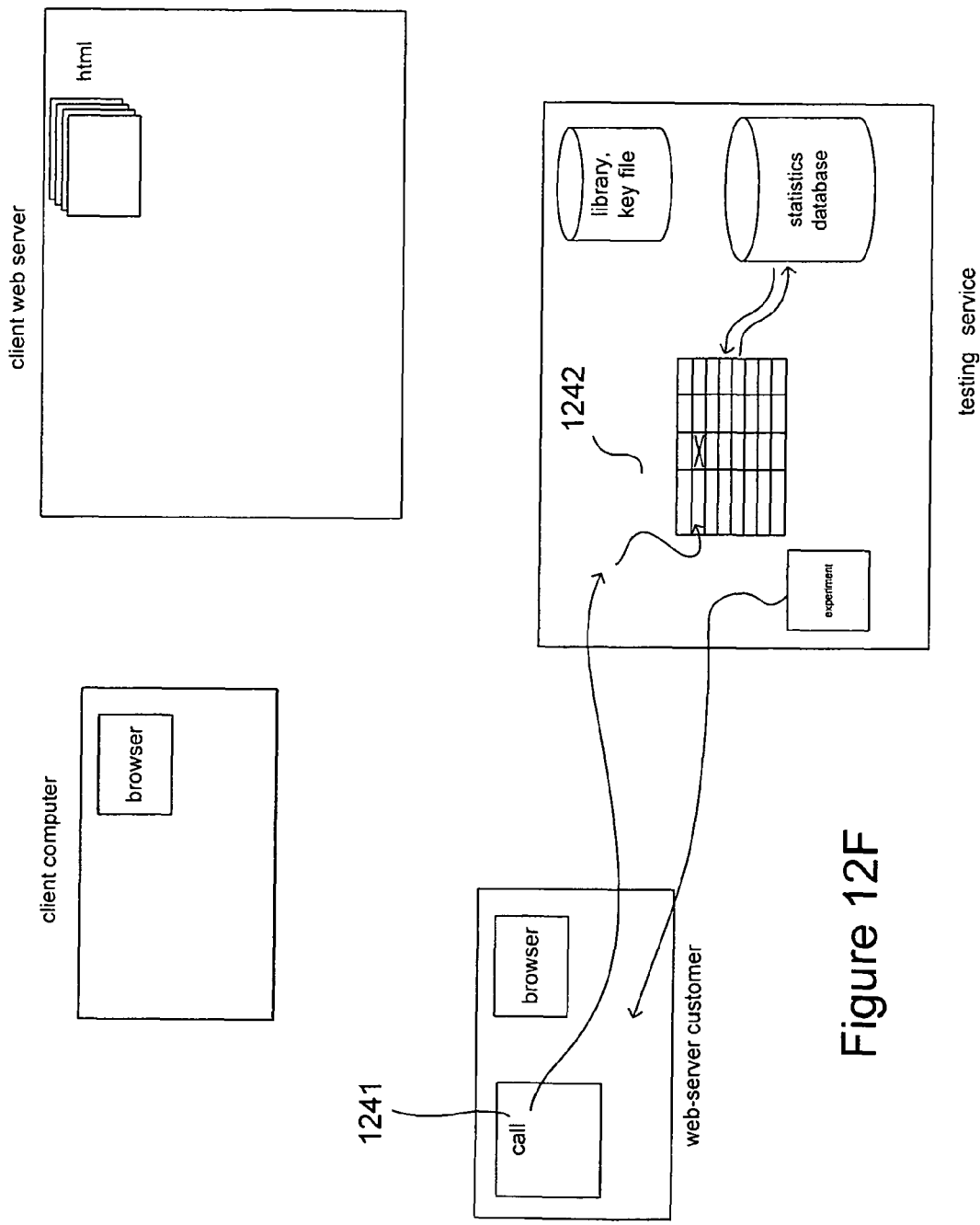
Figure 12G:
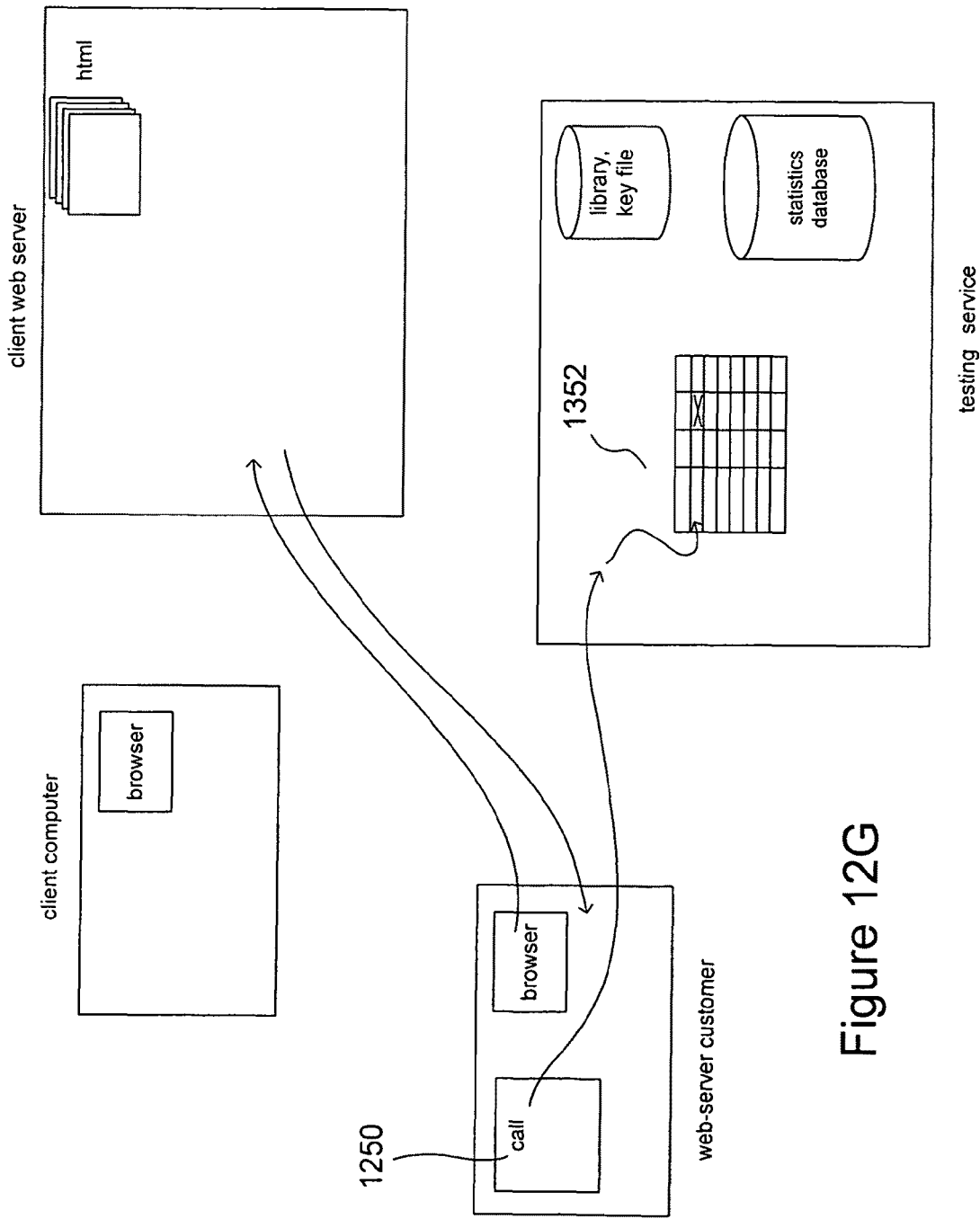

Next, as the browser continues to process the HTML, as shown in FIG. 12F, the browser encounters a call to the library routine "WM.setup" 1241. When executed by the browser, WM.setup initiates one or more information exchanges with the testing service during which the testing service can access cookies and other information associated with the web page on the user's computer, and the user computer receives web-page modifications from the testing service. Cookies can be used, for example, to ensure that a test subject who repeatedly accesses a landing page receives the same experiment, or test page, each time. Only when the web page being processed by the user computer is an active test page, and the user computer is an active test subject, are web-page modifications returned to the user computer by the testing service, and information uploaded by the testing service from the user computer. When this web page and user are validated, the testing service records the page accessed by the user, an identifier of the user, and a time of access in one or more database entries 1242 and returns a snippet, representing one or more nodes or sub-trees of the DOM corresponding to the web page, to the user computer, which modifies the DOM constructed by the browser to incorporate the snippet downloaded by the testing service to the user. In other words, the testing service downloads modifications that transform the web page downloaded by the user to a particular altered web page representing an experiment. Thus, following the information transaction illustrated in FIG. 12F, the user's browser alters the DOM and displays, to the user, the altered web page corresponding to an experiment as part of the test run. The snippet is constructed or retried by the testing service based on the orthogonal-array test basis or other test design. The stored test design defines the experiments, from which the testing service selects experiments for provision to users in order to obtain a well-distributed sampling of experiments during the test. Subsequently, as shown in FIG. 12G, should the user download a page, or invoke a feature on a page, corresponding to a conversion event, the user's browser, in processing the HTML file, encounters a library call 1250 that results in an information transaction between the user and testing service. The testing service checks to ensure that the web page is a valid conversion page for an active test, that the user is a valid test subject. When all of these tests are valid, the conversion event is recorded 1352 for the experiment by the testing service.

Figure 12H:
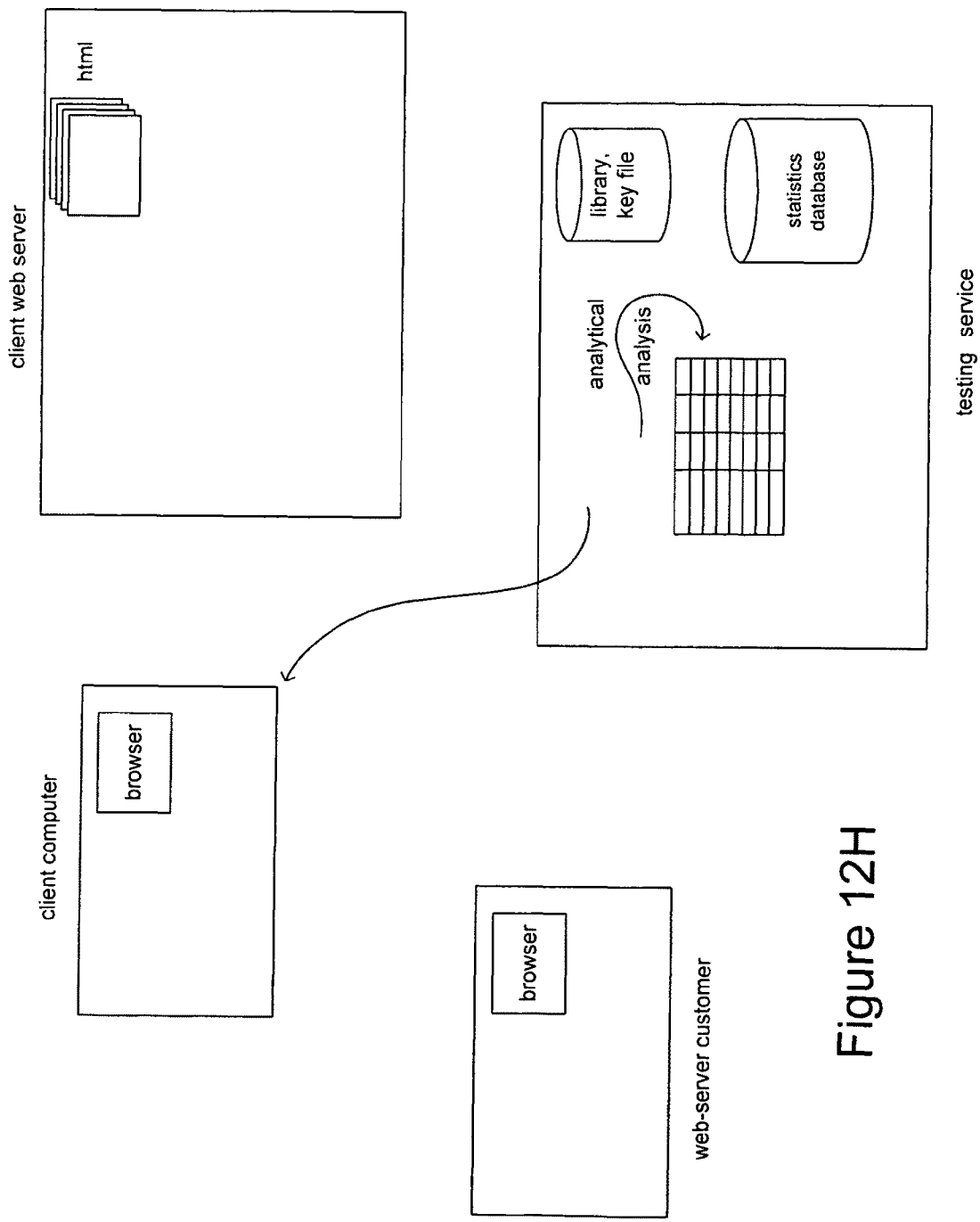

Finally, as shown in FIG. 12H, when the testing service has collected sufficient data to consider the test run to be complete, the testing service changes the status of the test run to complete, and may then undertake analysis and reporting of the test results. The test results may be automatically returned to the client web server, or may be subsequently returned, on demand, when the client checks the status of the test run and determines that the test run has been completed.

Figure 13A:
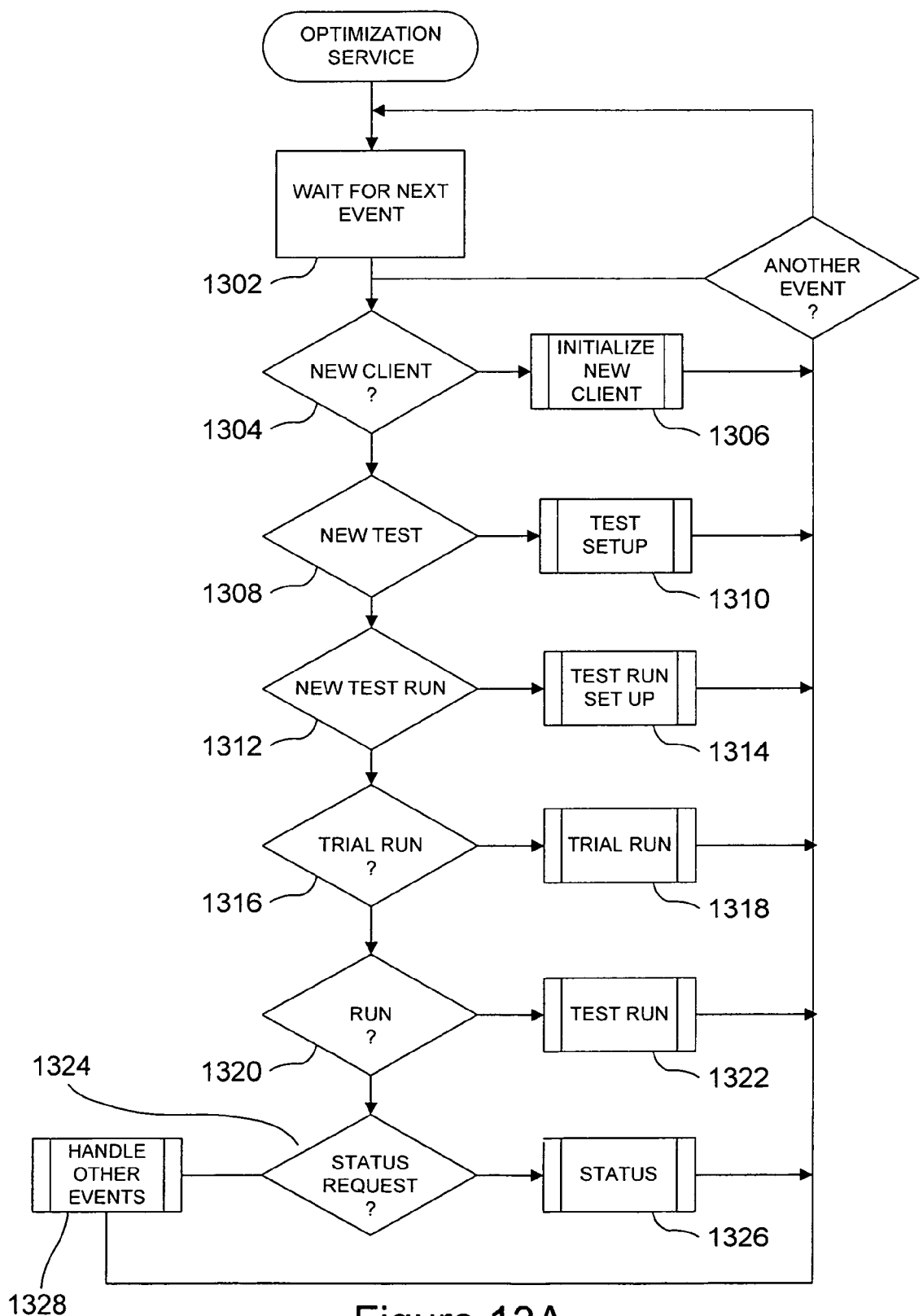
FIGS. 13A-H provide control-flow diagrams for a web-site testing service that represents one embodiment of the present invention.

FIGS. 13A-H provide control-flow diagrams for a web-site testing service that represents one embodiment of the present invention. FIG. 13A provides a high-level event loop carried out by the testing service on behalf of one or more clients. In step 1302, the testing services waits for a next client-generated event. When the event corresponds to access of the testing-service website for registration by a new client, as determined in step 1304, the routine "initialize new client" is called in step 1306. When the event is a request to construct a new test by an already-registered client through the test-configuration interface, as determined in step 1308, the routine "test setup" is called in step 1310. When the event is a request to configure a new test run, as determined in step 1312, the routine "test run setup" is called in step 1314. When the event is a request to launch a trial run, as determined in step 1316, the routine "trial run" is called in step 1318. When the event is a request to launch a test run, as determined in step 1320, the routine "test run" is called in step 1322. When the event is a status, information request, or information-update request, as determined in step 1324, then the routine "status" is called in step 1326. For example, a client can obtain test-result information during a test run, and can additional obtain analysis results following completion of a test run. Any of various additional types of events are handled in a default event handler in step 1328. Additional events include log-ons to the testing service web site by registered clients, during which clients are authorized and authenticated.

Figure 13B:
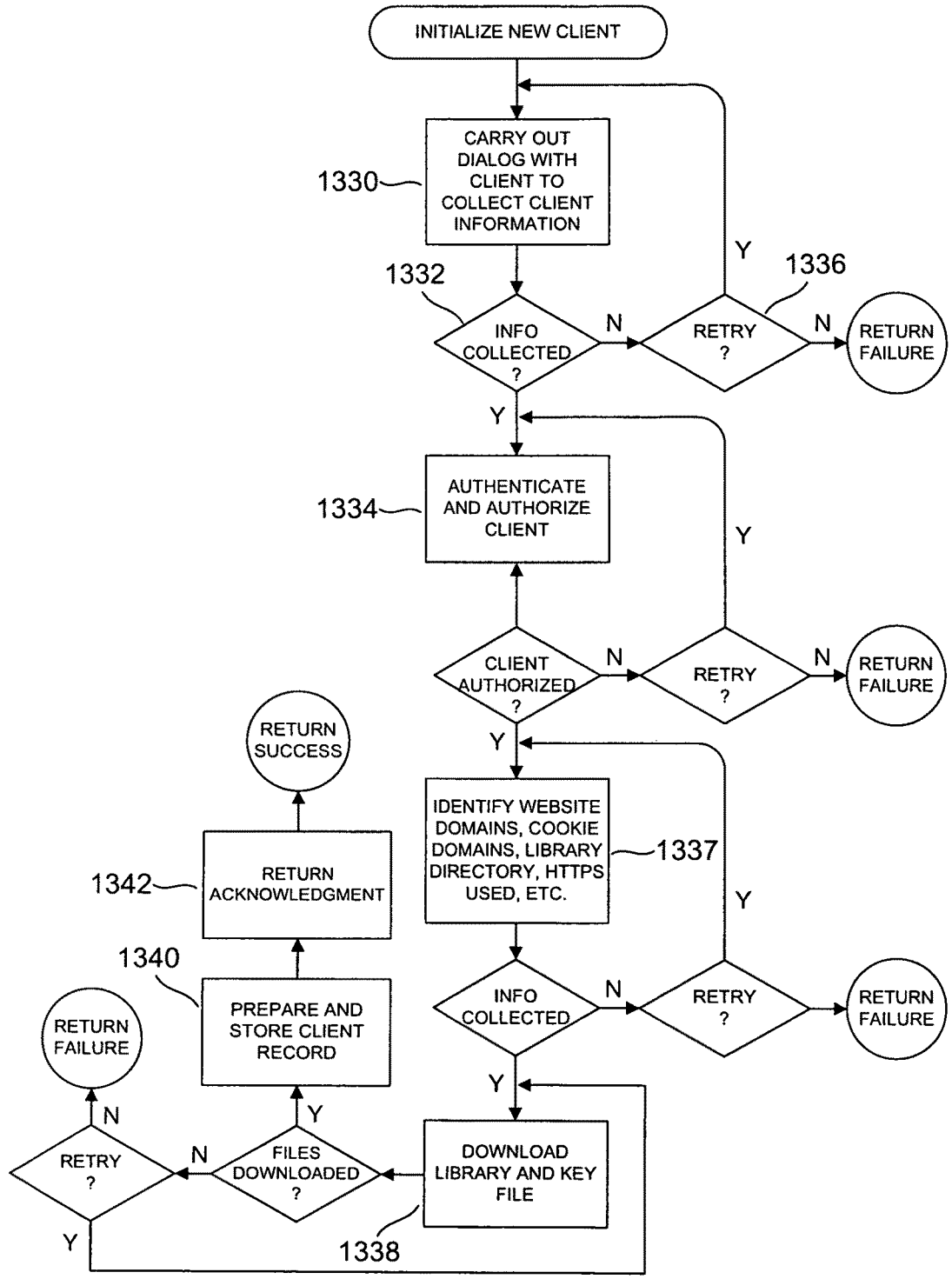

FIG. 13B provides a control-flow diagram for the routine "initialize new client" called in step 1306 of FIG. 13A. In step 1330, the testing service carries out a dialog, through the testing service web site interface, with a prospective client in order to collect information about the client. This information may include the client's name, address, billing address, web site URL, and other such information. If all needed information has been collected through this dialog, as determined in step 1332, then the testing service proceeds to authenticate and authorize the prospective client, in step 1334. Otherwise, as with most of the steps carried out by the testing service during dialogs with clients of the testing service, the testing service may elect to retry a previous step, as determined in the current case in step 1336, in order to make an attempt to acquire the remaining needed information or, in certain cases, may simply return an error message and fail. Once a client has been authorized, the testing service, in step 1336, either through a dialog or via automated methods, determines the web site domains and cookie domains of the client web server, and obtains, from the client, specification of a file-system location at which to download to the client web server the library and key files. In addition, the testing service determines whether or not to use a secure protocol when communicating with client-web-server users and any other information needed for executing tests. Then, in step 1338, the testing service creates and downloads the script library and key files to the client web server. In step 1340, the testing service prepares and stores one or more client records that describe the client and provide a basis for further interactions with the client and, finally, in step 1342, return an acknowledgement to the client. In an actual testing service system, client initialization may contain many additional steps, and may involve solicitation and acquisition of many additional different types of information.

Figure 13C:
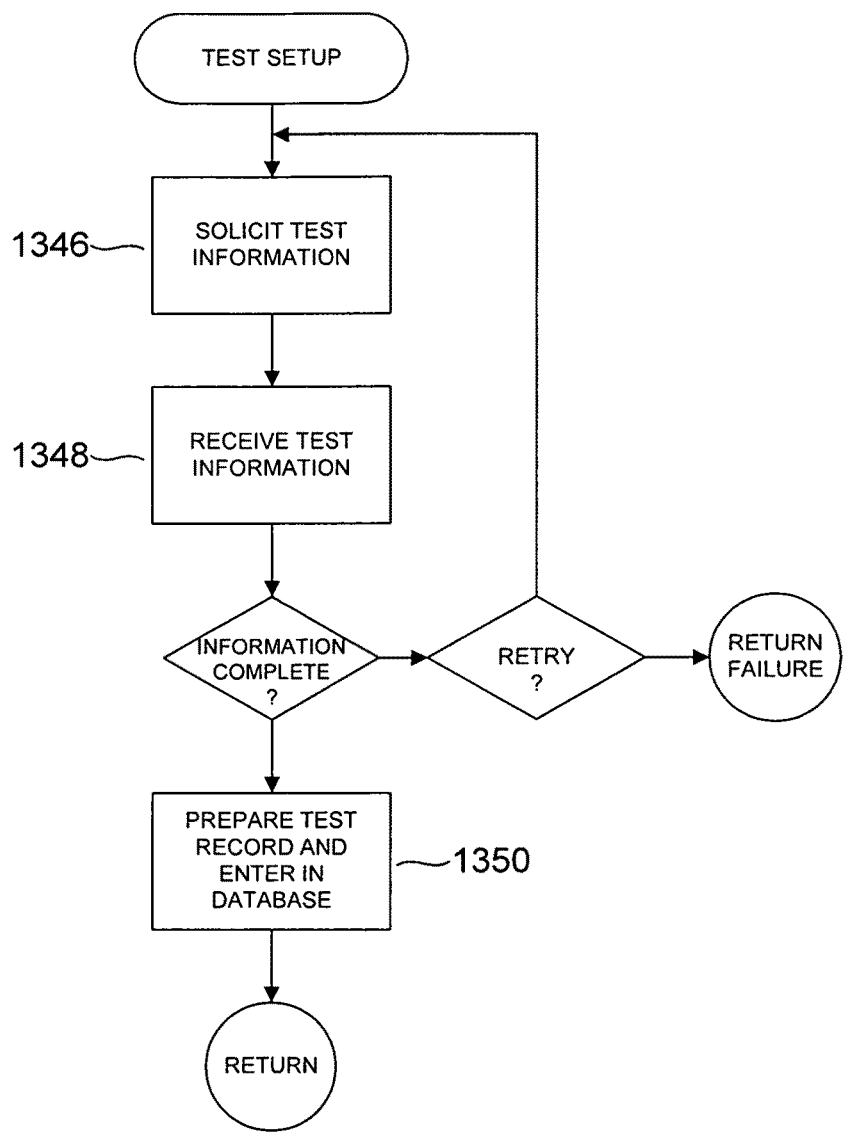

FIG. 13C provides a control-flow diagram for the routine "test set up" called in step 1310 of FIG. 13A. In step 1346, the testing service solicits test information from the client and receives the solicited information in step 1348. Steps may be iterated in order to carry out a dialog during which the needed information to prepare and store a record describing a test is acquired by the testing service. Once the information is received, the testing service prepares a test record and enters the test record in the testing service's database in step 1350 in association with, or referenced by, one or more client records. As discussed above, test information may include a test name, creation date, description, list of factors, and other information that provide a basis for subsequent construction of test runs.

Figure 13D:
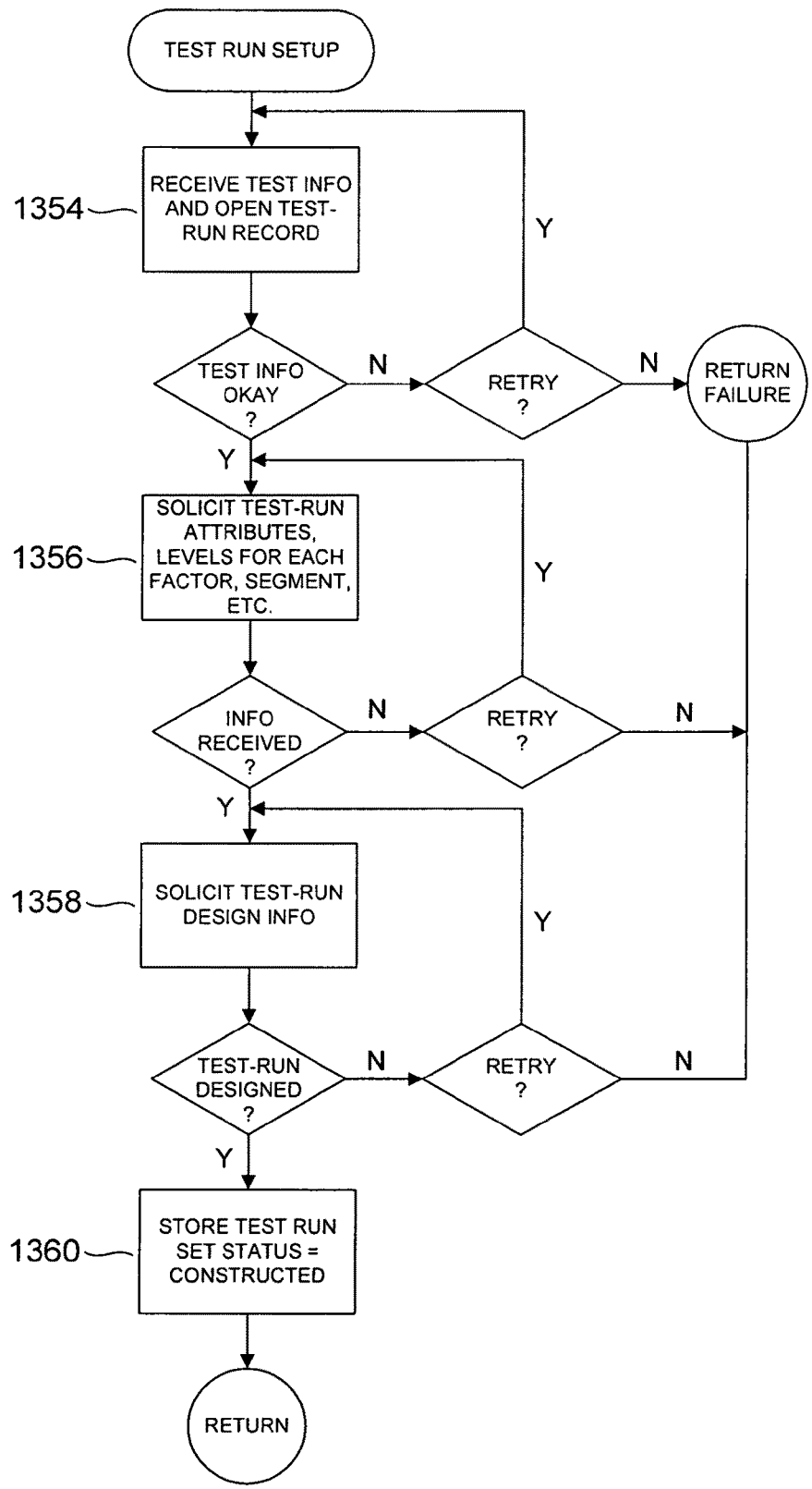

FIG. 13D provides a control-flow diagram for the routine "test run setup" called in step 1314 of FIG. 13A. In step 1354, the testing service receives information about a next test run and opens a test record for the test run. Step 1354 may involve multiple information exchanges with the client. It should also be noted that the client may elect to update or modify an already existing test run, in which case an already existing test-run record is accessed in step 1354. Next, in step 1356, the testing service carries out an information exchange with the client to obtain all the information that defines a test run, including various attributes, the levels for each factor, a specification of a test segment, and other such information. Once that information is received, then, in step 1358, the testing service provides various orthogonal-array-based or other test-design-based testing alternatives to the client, from which the client web server selects a particular test design. Various different orthogonal-array-based test designs or other types of test designs may be associated with different advantages and disadvantages, and selection of an orthogonal-array-based test or other test design may involve consideration of a number of different trade-offs, including potential length of the test run, computational requirements on the testing service, and many other such factors. Finally, in step 1360, the testing service prepares and stores a test-run record and, in addition, sets the test-run status to "constructed." Note that, in certain embodiments of the present invention, an initial under-construction status may be associated with a test run as it is being defined and constructed by the routine "test run setup."

Figure 13E:
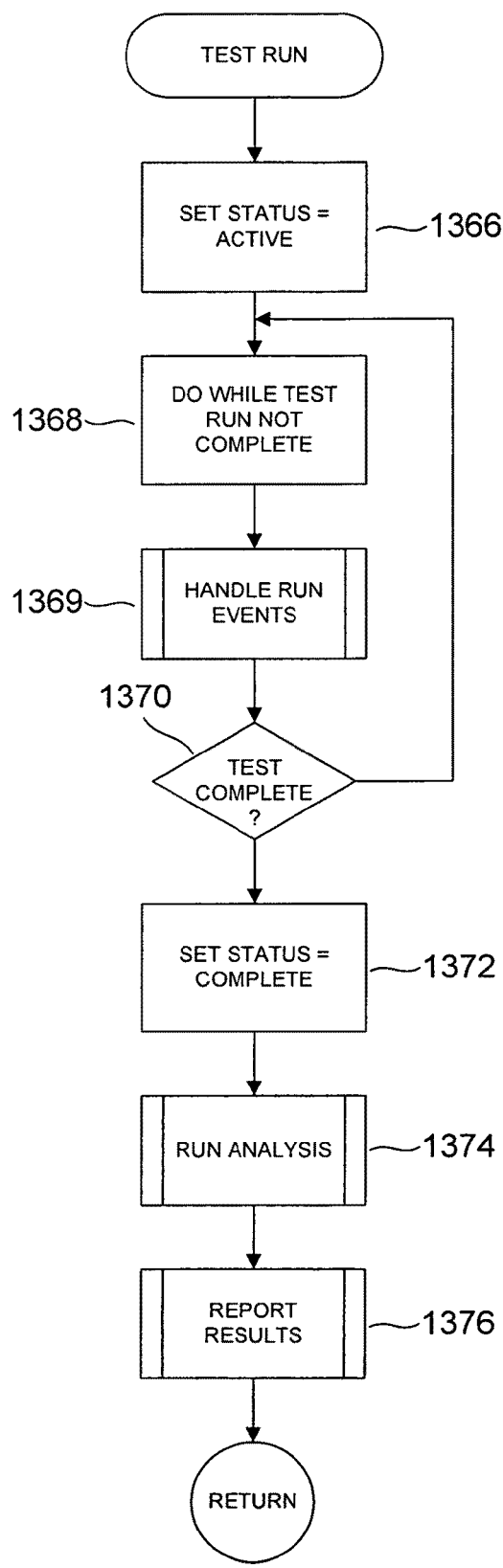

FIG. 13E provides a control-flow diagram for the routine "test run," called in step 1322 of FIG. 13A. In step 1366, the testing service sets the status of the test run to "active." Then, in a continuous loop comprising steps 1368-1370, the testing service continues to handle test-run events, primarily information exchanges with test subjects' computers invoked by execution of script-library routines by users' browsers, until the test is complete, as determined in step 1370. In general, a test run continues until sufficient data has been collected to provide statistically meaningful results. However, various embodiments of the present invention provide additional means for test runs to be halted through the test-configuration interface by clients, and may provide for halting of test runs by the testing service when certain desirable events or test-run-execution characteristics are detected during the test run by the testing service. Once a test run is completed, the testing service sets the status of the test run to "complete," in step 1372, and then may undertake analysis of the test results and reporting of results of the analysis, in steps 1374 and 1376. As briefly discussed, above, results may also be reported to a client during the test run, through the web-site interface.

Figure 13F:
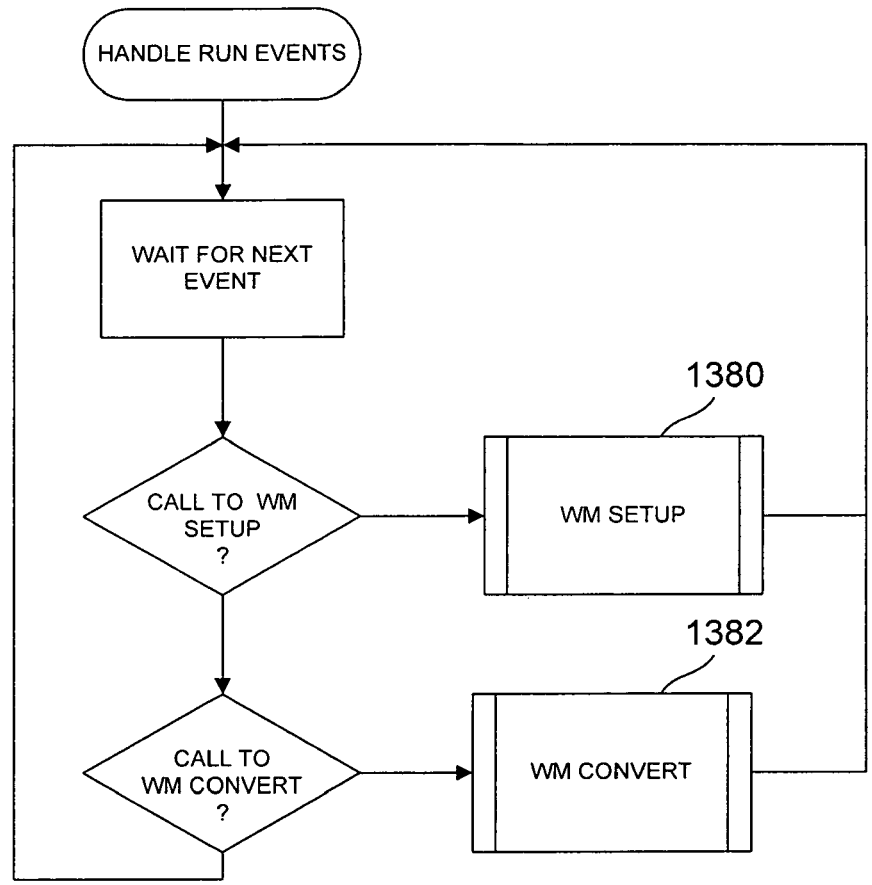

FIG. 13F is a control-flow diagram of the routine "handle run events" called in step 1369 of FIG. 13E. This routine is a simple event handler, in which messages sent from user computers as a result of calls to the script-library routine "WM.setup" by user browsers are handled by a call to the routine "wmsetup," in step 1380, and messages sent from user computers as a result of calls to the script-library routine "WM.convert" by user browsers are handled by a call to the routine "wm convert," in step 1382. Note that the script-library routines "WM.setup" and "WM.convert" are called by a browser running on the user computer, and those script routines, in turn, call routines that initiate an information transmission with the testing service.

Figure 13G:
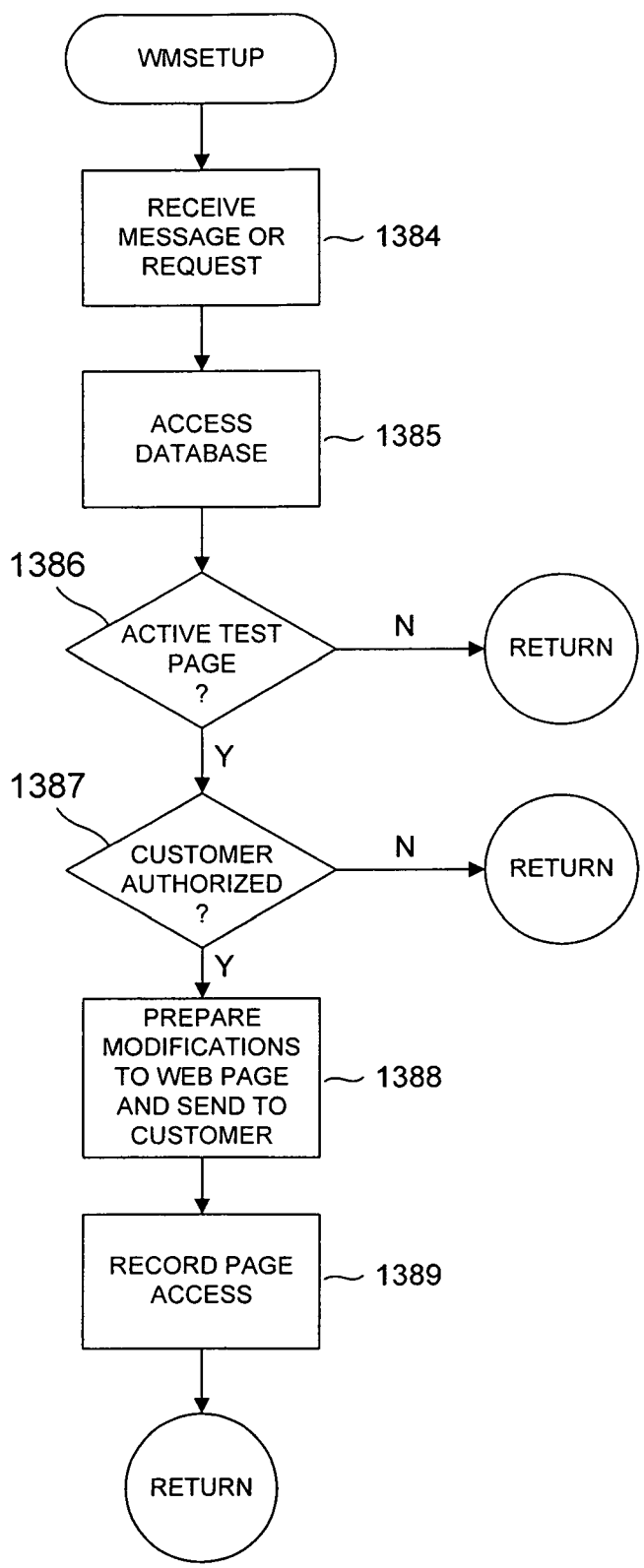

FIG. 13G provides a control-flow diagram of the routine "wmsetup" called in step 1380 of FIG. 13F. In step 1384, the testing service routine receives a message, for request, from a user computer as a result of execution, by a user's browser, of the script-library routine "WM.setup." In step 1385, the testing service uses a URL for the web page being processed to access the database or databases maintained by the testing service in order to determine whether or not the call to WM.setup represents a page-access event or a conversion event, the type of test being run, whether or not the web page is an active test page and the user computer is a valid and active test subject, and other such information. When the test page that included a call to "WM.setup," which, in turn, generated the message or request received in step 1384, is an active test page, as determined in step 1386 by the testing service, and when the user computer is an authorized test subject, as determined in step 1387, then, in step 1388, the testing service then in the case that the call to WM.setup represents a landing-page-access event, prepares the DOM modifications needed to generate an experiment for display on the user computer and transmits those modifications to the user computer. Finally, in step 1389, the testing services records either a landing-page-access event by the user computer or a conversion event, depending on the web page. Note that, in the case that the page from which the call to "WM.setup" was made is not an active test page, or in the case that the user computer is not an active and authorized test subject, the routine "wmsetup" simply returns. In other words, there is almost no performance penalty and no perturbation to the client's web server in the case that a user accesses an inactive test page or in the case that non-test-subject users access test pages. Steps 1384 and 1385 may include one or more information exchanges between the user computer and testing service.

Figure 13H:
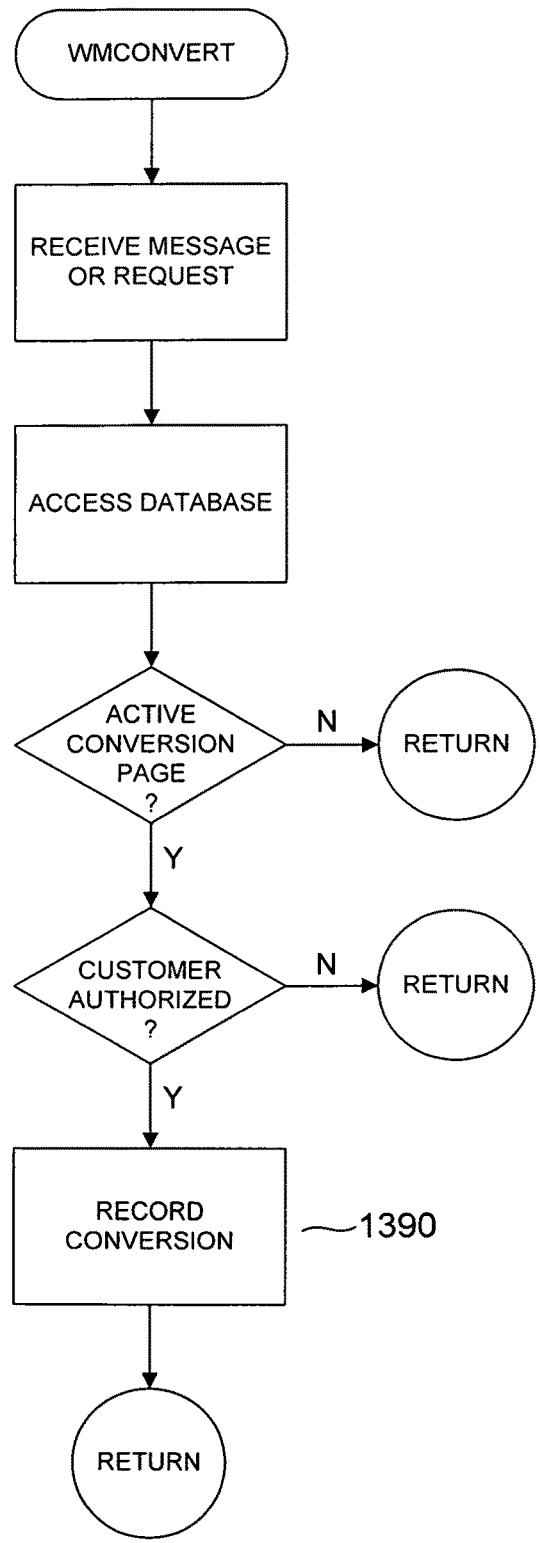

FIG. 13H is a control-flow diagram for the routine "wmconvert" called in step 1382 of FIG. 13F. This routine is similar to the routine "wmsetup," described with reference to FIG. 13G. The primary difference is that this routine is only called for a conversion event, which is recorded, in step 1390, as conversion event in a testing-service database.

The routine "trial run," called in step 1318 of FIG. 13A, is similar to the routine test-run, discussed above, with the exception that a trial-run status may be set for the test run during a trial run. The routine "trial run" is not further discussed. The routine "status," called in step 1326, returns status information with respect to test runs and other information about tests, test runs, and clients. Implementation of this routine is strongly dependent on the particular database organizations used by the testing service and on the particular web-site interface provided to clients, and is not further discussed.

FIG. 14 shows the HTML modifications used to virtually incorporate a testing service that represents one embodiment of the present invention into a web site. The HTML code, previously shown in FIG. 3, includes first statement 1402 that directs a browser to download the script-routine library and a second statement 1404 that calls a script-library entry point "WM.setup" that results in sending a message or request to the testing service to indicate a landing-page-access event or page-access-conversion event. A page that includes a displayed object, activation of which is defined to be a conversion even, is similarly modified to include a call to the library routine "WM.convert." By merely adding two statements to an HTML file, or three in the case that the page corresponds both to a landing-page-access event and to a conversion event, the HTML file becomes a potential test web page, and the testing service is virtually incorporated into the client web server. Again, the statements used to modify landing-access-event-associated web pages are identical for all such web pages, as is the statement that is used to modify display-objects associated with conversion events. A client can easily write a script or other program, or use a content-management-system programming interface to introduce these identical statements into web pages. FIG. 15 provides an exemplary script library downloaded service that represents one embodiment of the present invention by a testing into a web-site server.

Although the present invention has been described in terms of particular embodiments, it is not intended that the invention be limited to these embodiments. Modifications will be apparent to those skilled in the art. For example, many different alternative embodiments of the testing service can be implemented by varying software-implementation parameters, including choice of programming languages, operating systems, control structures, data structures, modular organization, and by varying other such parameters. Alternative embodiments may provide for enhanced testing services and functionality, and may use a variety of different analytics packages and report-generation tools for processing collected data. The above-described techniques for virtual incorporation of the testing service into a client web server can be also employed for non-testing applications, including automated generation and display of advertising, automated display of rapidly changing information, and other applications in which web pages need to be dynamically modified and provided to users.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A testing service comprising:
one or more testing-service computer systems connected to the Internet that execute testing-service routines, maintain one or more databases, and receive and respond to web-page requests and test-subject-computer requests; and
a client web server that serves web pages to users, the client web server storing a library of routines downloaded to the client web server by the testing service and storing encodings of the web pages, the encoding of each web page tested by the testing service including modifications that direct a user's web browser to download the library of routines from the client web server and to request modifications to a data-object-model representation of the web page by calling a script-library routine.

2. The testing service of claim 1 wherein the testing service routines include:
testing-service routines that implement a web server that provides a web-site interface to clients;
testing-service routines that handle test-related events that occur during test runs; and
testing routines that manage test data storage and access and that pass test data to analytics and test-result reporting routines.

3. The testing service of claim 2 wherein the testing-service web server provides a new-client registration interface, a test-creation-and-test-modification interface, a test-run-creation-and-modification interface, a test-run-launching interface, a status-reporting interface, and additional interfaces that allow clients to request analysis and reporting of test results.

4. The testing service of claim 2 wherein the testing service routines that handle test-related events that occur during test runs receive requests from user computers that download test pages from the client web server for modifications to the downloaded page and respond to each request, when the request is received from a computers of a user representing a valid test subject as a result of downloading an active test page, by logging a page access for the user computer and by returning web-page modification to the user computer that, when carried out by the user computer, transforms the downloaded web page into a test page.

5. The testing service of claim 2 wherein the testing service routines that handle test-related events that occur during test runs receive messages from user computers that download test pages, which represent conversion events, from the client web server and respond to each message reception, when the message is received from a computer of a user representing a valid test subject as a result of downloading an active test page representing a conversion, by logging a conversion event for the user computer.

6. The testing service of claim 2 wherein a web site test is represented by a stored data object that includes a test name, indication of the client who created the test, a test description, an indication of a web page that is the subject of the test, and indications of the features of the web page that are to be systematically altered during a test.

7. The testing service of claim 6 wherein a web site test is associated with one or more records that specify a particular test run, the test-run records indicating the alternatives for each tested web-page feature, a user segment that represents the test subjects for the test run, a test-run design according to which web pages are modified and distributed, an indication of one or more conversion events for the test run, and a test-run status.

8. An information-distribution-testing system comprising:
a client server that, when testing is not being carried out, serves one or more information entities to a user device and that, when testing is being carried out, serves one or more modified information entities to the user device as well as provides a library of routines to the user device; and
a testing-service computer system that, when testing is being carried out, receives and stores information about user interactions with displayed information corresponding to the one or more information entities under test and, in response to a request from a routine executed by the user device, returns one or more subtree data structures to the user device that, when incorporated into a tree data structure constructed to represent the displayed information by the user device, changes the information displayed by the user device.

9. The information-distribution-testing system of claim 8 wherein the testing-service computer system additionally provides a client interface to the client to allow the client to be initialized and to configure web-page testing.

10. The information-distribution-testing system of claim 8 wherein the information entities are data files that specify displayed information.

11. The information-distribution-testing system of claim 10 wherein the information entities are HTML data files.

12. The information-distribution-testing system of claim 10 wherein an application program on the user device renders an information entity for display.

13. The information-distribution-testing system of claim 12 wherein the displayed information is a displayed web page.

14. The information-distribution-testing system of claim 8 wherein the sub tree data structures are data-object-model trees constructed by a web browser from HTML files.

15. The information-distribution-testing system of claim 8 wherein the one or more modified information entities are HTML files that each includes one or two additional single-line statements and one or more additional object identifiers for objects under test not associated with object identifiers in a corresponding unmodified HTML file.

16. An information-distribution-testing system comprising:
a testing-service computer system that
provides a client interface to a client that manages a client information server that serves information entities to a user device;
downloads a library of routines to the client information server;
stores client information and test-configuration received from the client through the client interface in memory; and
when testing is being carried out on one or more information entities, receives and stores information about user interactions with displayed information corresponding to the one or more information entities under test and, in response to a request from a routine executed by the user device, returns one or more subtree data structures to the user device that, when incorporated into a tree data structure constructed to represent the displayed information by the user device, changes the information displayed by the user device corresponding to the one or more information entities under test.

17. The information-distribution-testing system of claim 16 wherein the information entities are data files that specify displayed information.

18. The information-distribution-testing system of claim 17 wherein the information entities are HTML data files.

19. The information-distribution-testing system of claim 16 wherein an application program on the user device renders an information entity for display.

20. The information-distribution-testing system of claim 16 wherein the displayed information is a displayed web page.

* * * * *